(12) United States Patent
Takahashi et al.

(10) Patent No.: US 12,128,409 B2
(45) Date of Patent: Oct. 29, 2024

(54) MICROCHIP AND MICROPARTICLE FRACTIONATING DEVICE

(71) Applicant: Sony Corporation, Tokyo (JP)

(72) Inventors: Kazuya Takahashi, Kanagawa (JP); Tatsumi Ito, Kanagawa (JP); Yoichi Katsumoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 19 days.

(21) Appl. No.: 17/687,500

(22) Filed: Mar. 4, 2022

(65) Prior Publication Data

US 2022/0184623 A1 Jun. 16, 2022

Related U.S. Application Data

(63) Continuation of application No. 16/483,070, filed as application No. PCT/JP2018/005148 on Feb. 15, 2018, now Pat. No. 11,305,281.

(30) Foreign Application Priority Data

Feb. 17, 2017 (JP) ................. 2017-027583

(51) Int. Cl.
*B01L 3/00* (2006.01)
*G01N 15/14* (2024.01)
(Continued)

(52) U.S. Cl.
CPC ... *B01L 3/502761* (2013.01); *B01L 3/502776* (2013.01); *G01N 15/1404* (2013.01);
(Continued)

(58) Field of Classification Search
CPC ......... B01L 3/502761; B01L 3/502776; B01L 2200/0636; B01L 2200/0652;
(Continued)

(56) References Cited

U.S. PATENT DOCUMENTS

2007/0065808 A1 3/2007 Bohm et al.
2011/0284378 A1 11/2011 Shinoda
(Continued)

FOREIGN PATENT DOCUMENTS

CN 102317755 A 1/2012
CN 103191791 A 7/2013
(Continued)

OTHER PUBLICATIONS

International Search Report and Written Opinion mailed Apr. 26, 2018 in connection with International Application No. PCT/JP2018/005148.
(Continued)

*Primary Examiner* — Jennifer Wecker
*Assistant Examiner* — Kathryn Elizabeth Limbaugh
(74) *Attorney, Agent, or Firm* — Wolf, Greenfield & Sacks, P.C.

(57) ABSTRACT

There is provided a microchip comprising: a main flow path through which a liquid containing microparticles flows; and a branch flow path that branches from the main flow path. A cross-sectional area of a portion of the main flow path is substantially constant up to a branch start position or decreases toward the branch start position, and a radius of curvature R of a side wall that connects a side wall of the main flow path and a side wall of the branch flow path is 0.5 mm or less and more than 0 mm.

14 Claims, 18 Drawing Sheets

(51) Int. Cl.
*G01N 15/1404* (2024.01)
*G01N 15/149* (2024.01)

(52) U.S. Cl.
CPC .. *G01N 15/1484* (2013.01); *B01L 2200/0636* (2013.01); *B01L 2200/0652* (2013.01); *B01L 2300/0819* (2013.01); *B01L 2300/0864* (2013.01); *B01L 2400/049* (2013.01); *G01N 2015/1415* (2013.01); *G01N 15/149* (2024.01)

(58) Field of Classification Search
CPC ..... B01L 2300/0819; B01L 2300/0864; B01L 2400/049; G01N 15/1404; G01N 15/1484; G01N 2015/1415; G01N 2015/149
See application file for complete search history.

(56) References Cited

U.S. PATENT DOCUMENTS

| | | |
|---|---|---|
| 2012/0153185 A1 | 6/2012 | Ito et al. |
| 2014/0027356 A1 | 1/2014 | Ito |
| 2014/0048458 A1 | 2/2014 | Ito |
| 2014/0061115 A1 | 3/2014 | DiBiasio et al. |
| 2015/0114093 A1 | 4/2015 | Appleyard et al. |
| 2019/0366343 A1 | 12/2019 | Takahashi et al. |
| 2020/0070152 A1 | 3/2020 | Kasai et al. |

FOREIGN PATENT DOCUMENTS

| | | |
|---|---|---|
| CN | 103212455 A | 7/2013 |
| CN | 103586221 A | 2/2014 |
| CN | 105073262 A | 11/2015 |
| CN | 105556279 A | 5/2016 |
| EP | 2 191 895 A1 | 6/2010 |
| JP | 2010-151777 A | 7/2010 |
| JP | 2012-127922 A | 7/2012 |
| JP | 2013542434 A | 11/2013 |
| JP | 2014-036604 A | 2/2014 |
| JP | 2014-039534 A | 3/2014 |
| JP | 2015-529155 A | 10/2015 |
| WO | WO 00/65337 A1 | 11/2000 |
| WO | WO 2013/018273 A1 | 2/2013 |
| WO | WO 2016/031486 A1 | 3/2016 |

OTHER PUBLICATIONS

International Search Report and Written Opinion mailed Jun. 1, 2018 in connection with International Application No. PCT/JP2018/007158.

International Preliminary Report on Patentability mailed Aug. 29, 2019 in connection with International Application No. PCT/JP2018/005148.

Japanese Office Action dated Dec. 25, 2020 in connection with Japanese Application No. 2017-027583 and English translation thereof.

[FIG. 1]
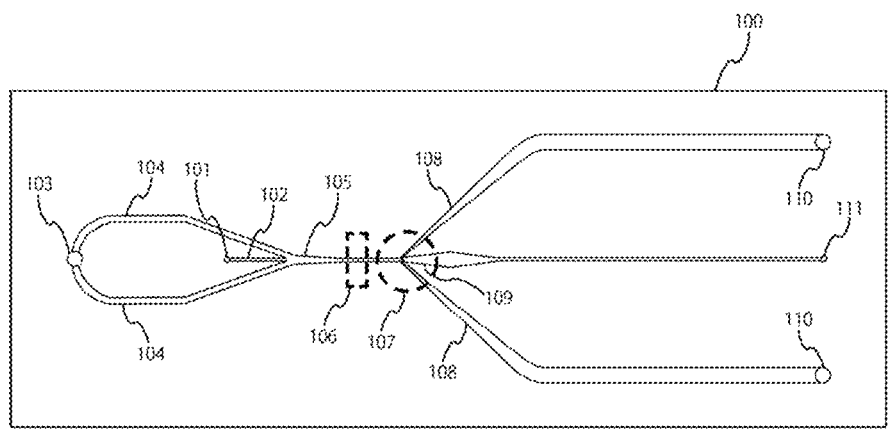

[FIG. 2]
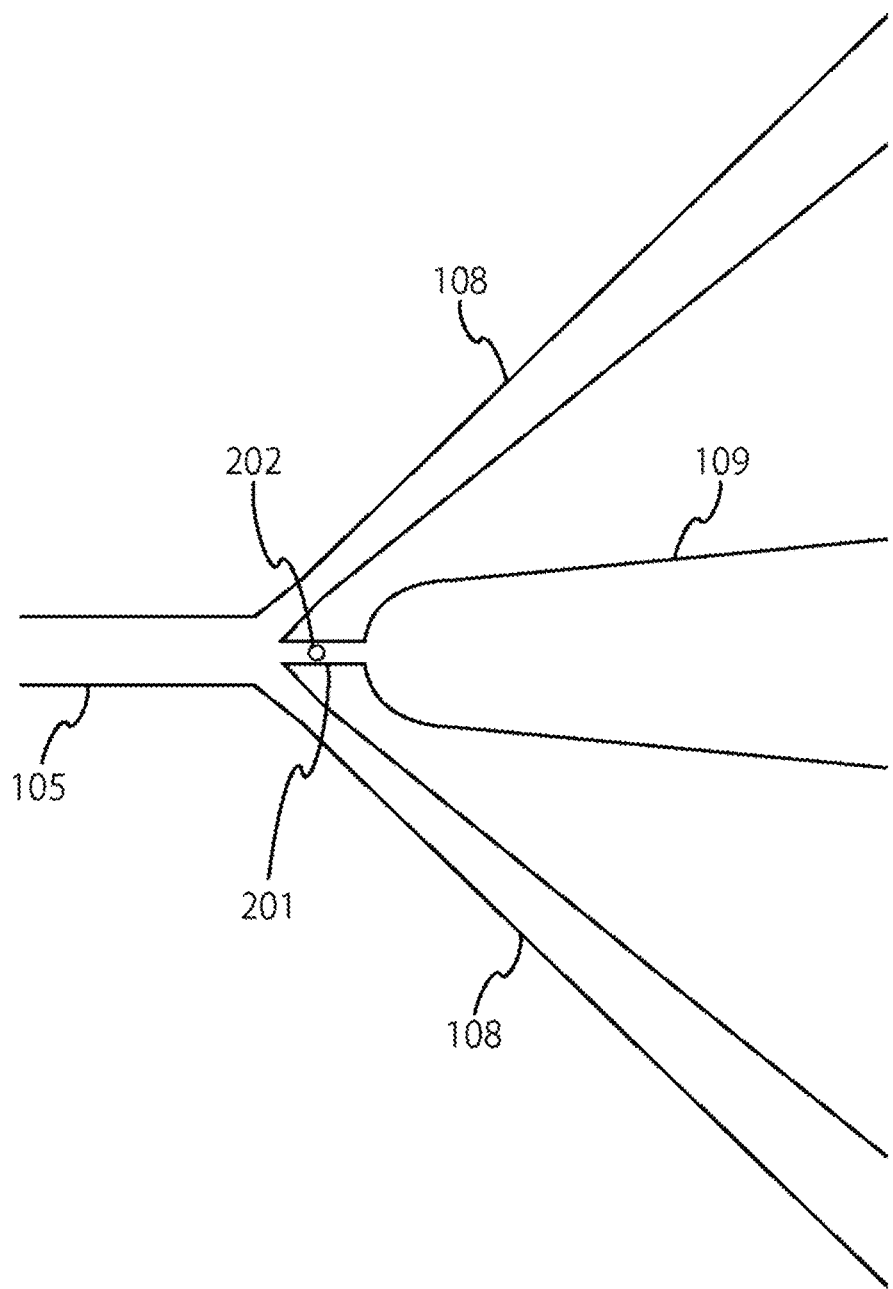

[FIG. 3]
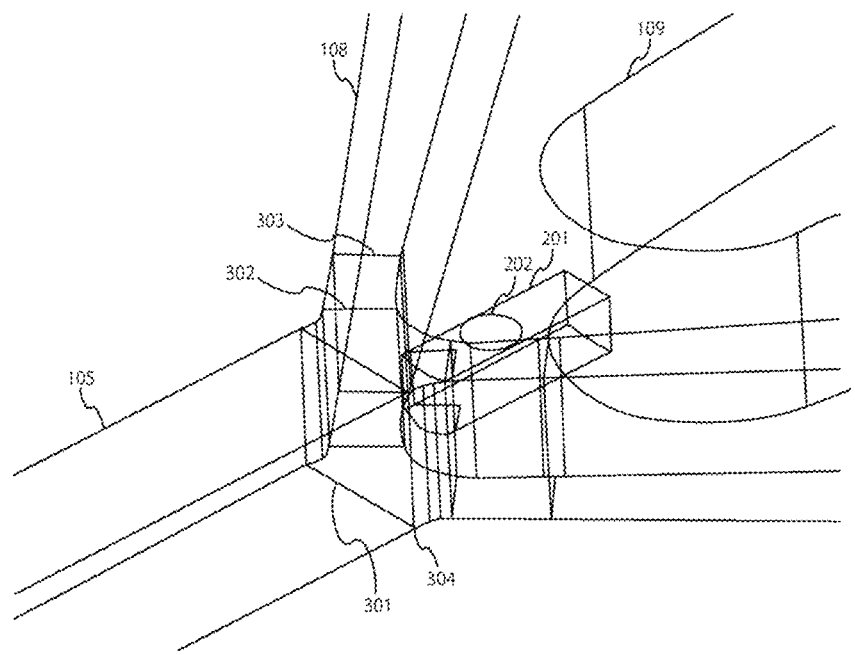
[FIG. 4]
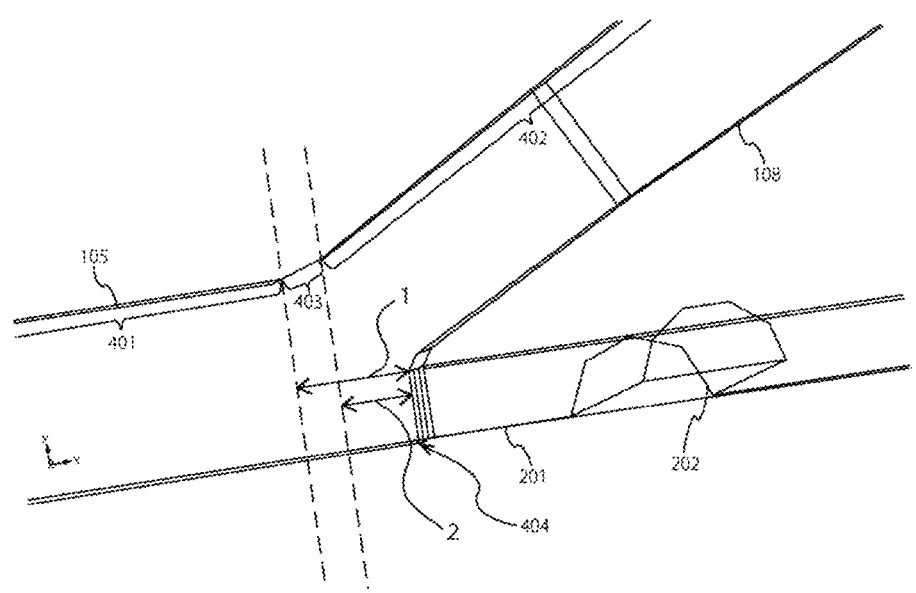

[FIG. 5]
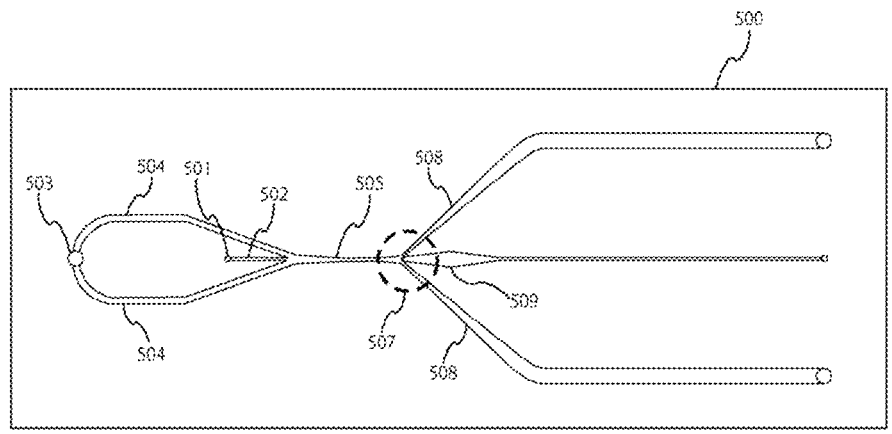
[FIG. 6]
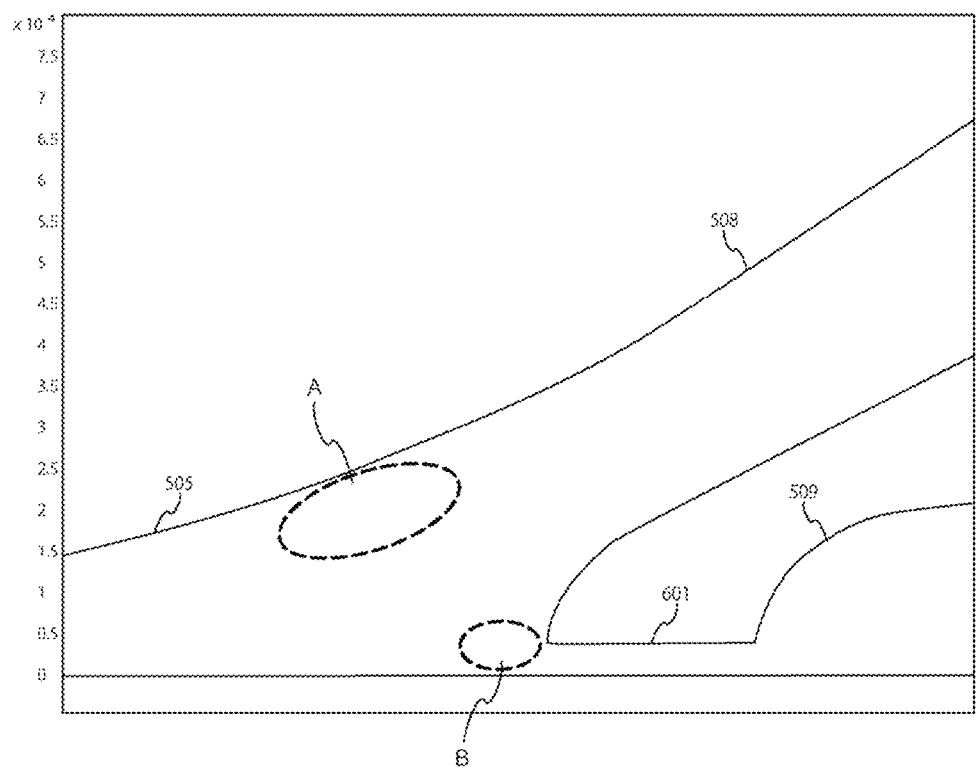

[FIG. 7]
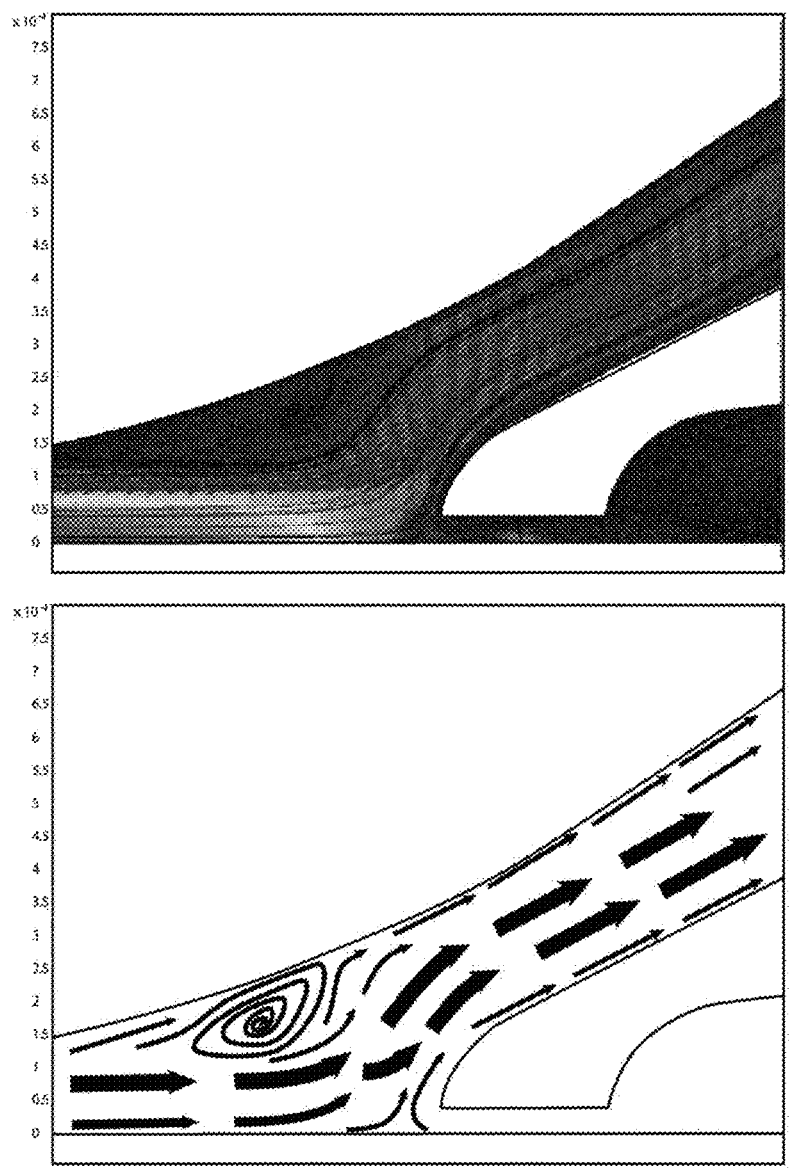

[FIG. 8]
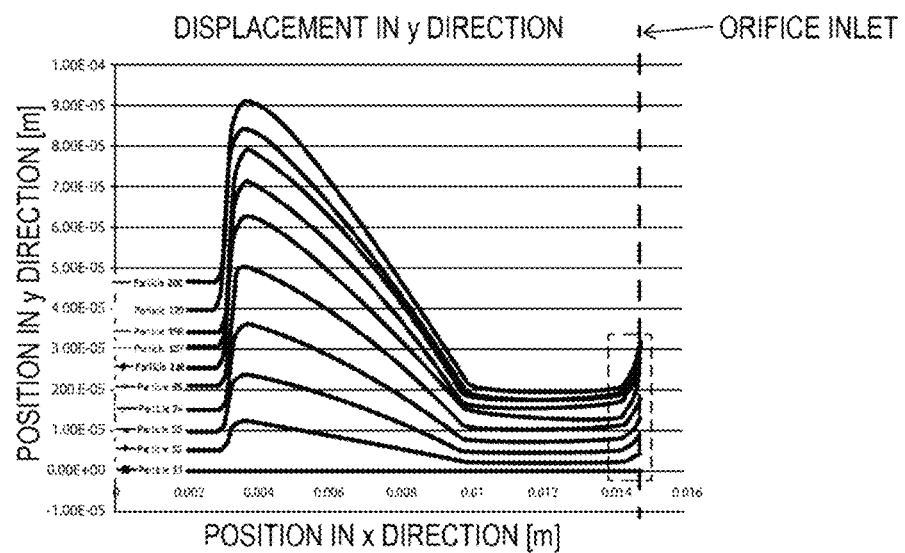
[FIG. 9]
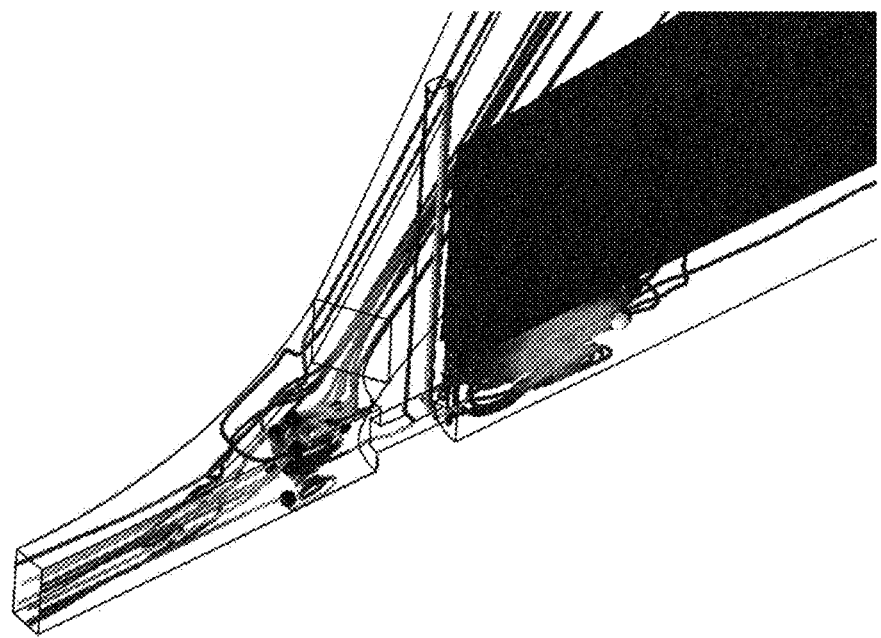

[FIG. 10]
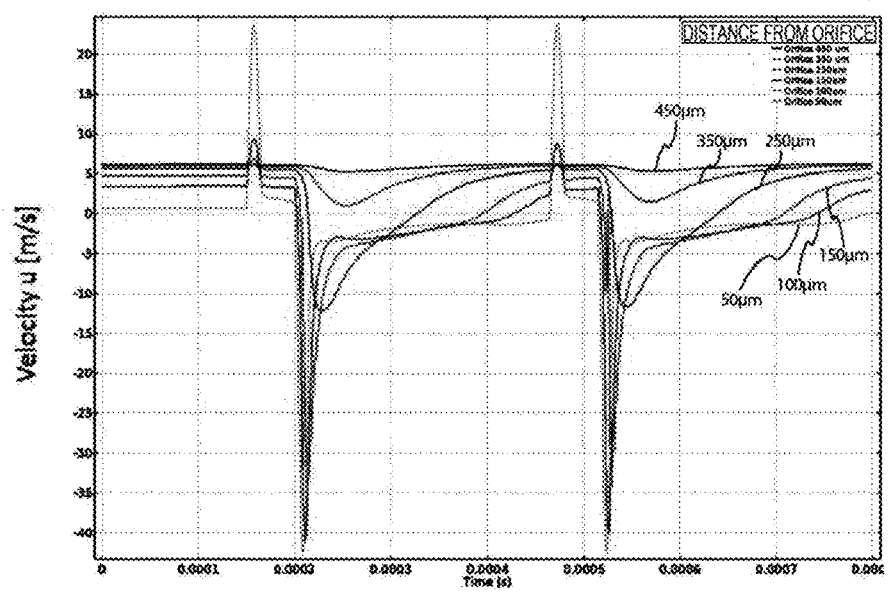

[FIG. 11]
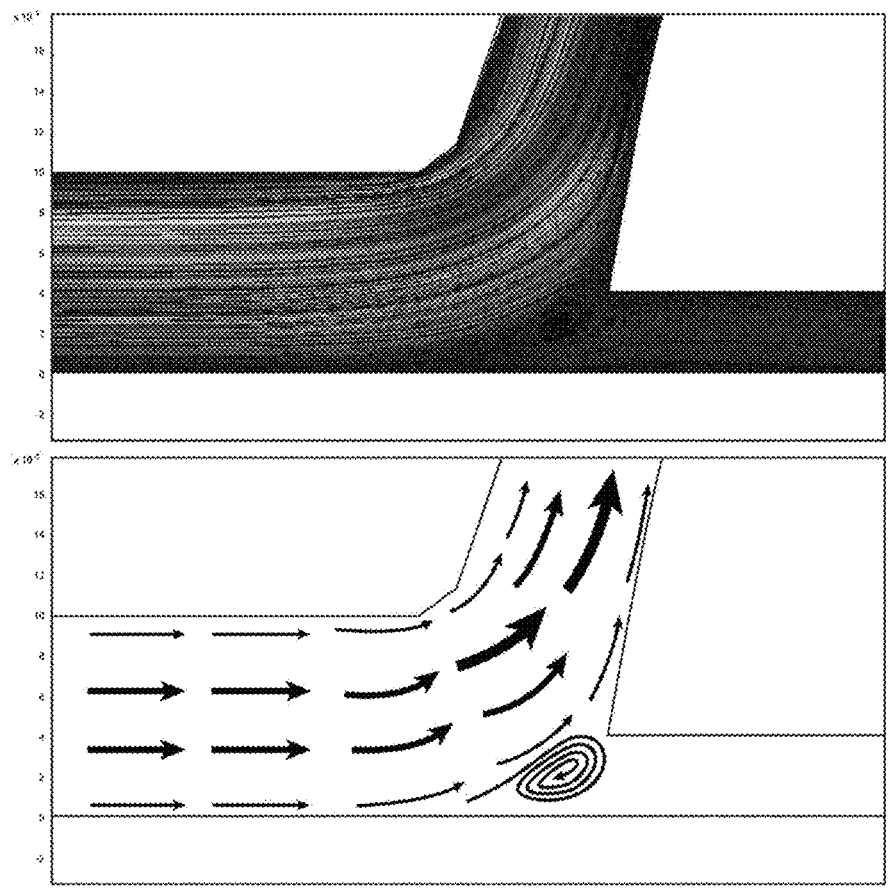
[FIG. 12]
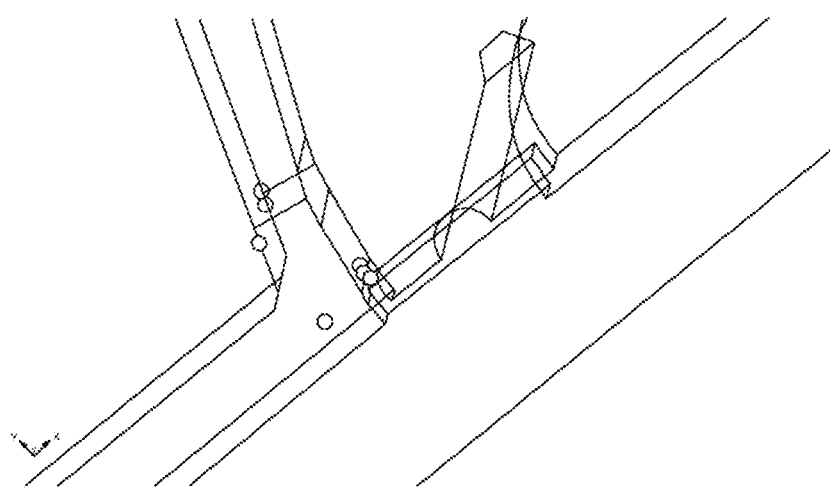

[FIG. 13]
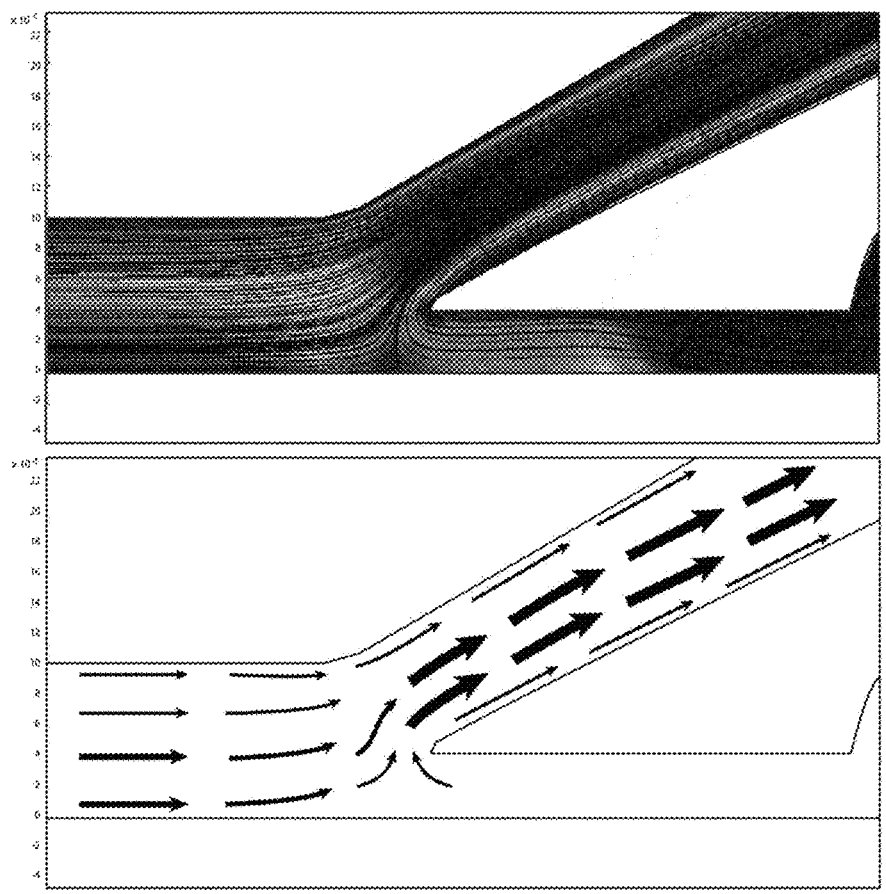

[FIG. 14]
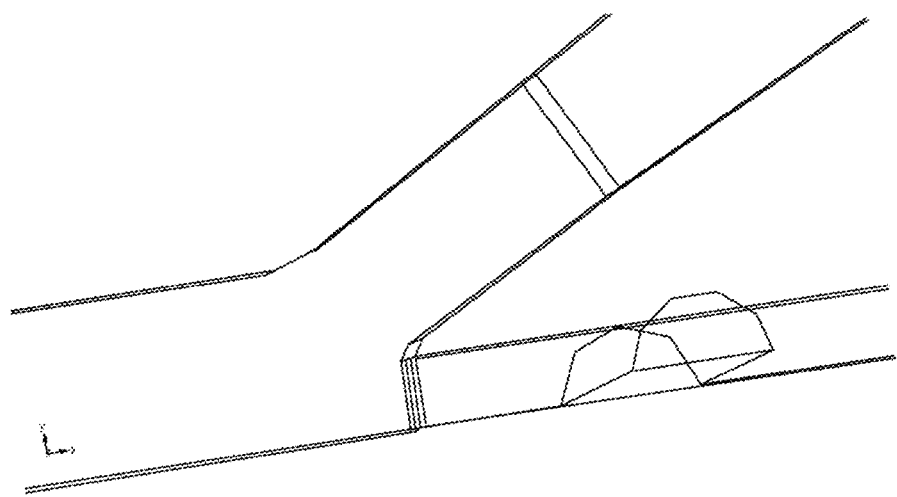

[FIG. 15]
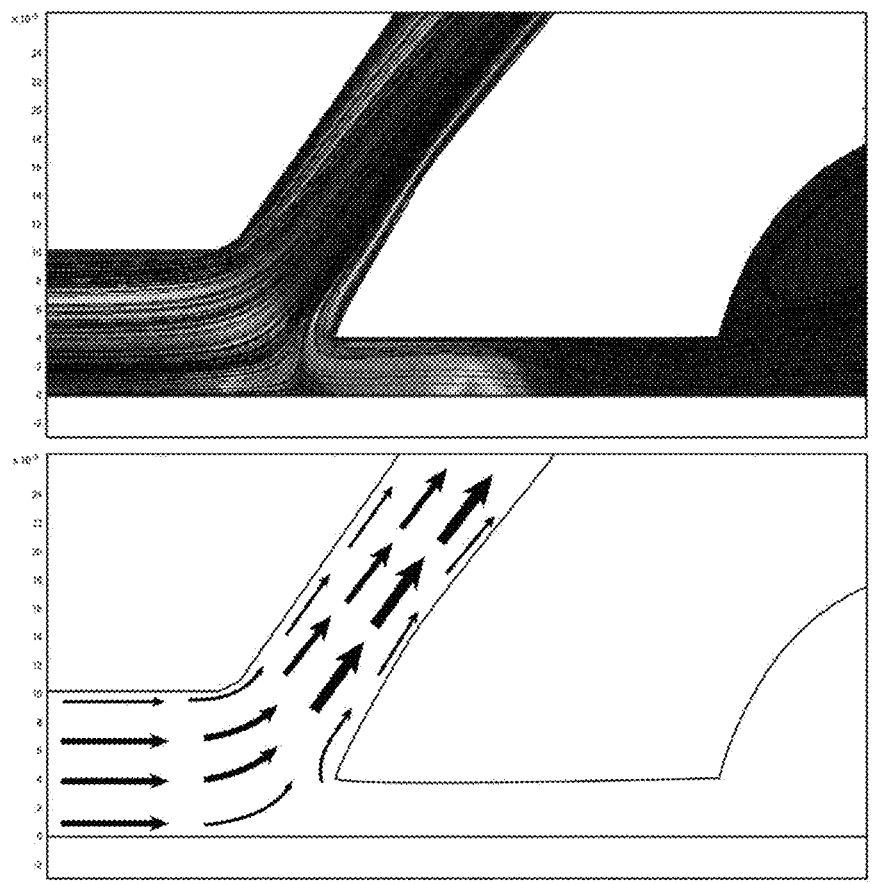

[FIG. 16]
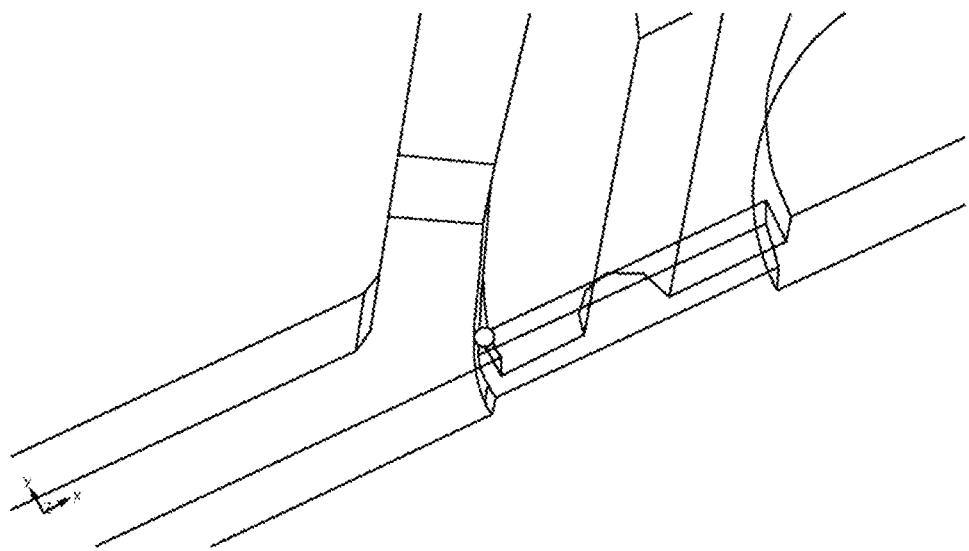

[FIG. 17]
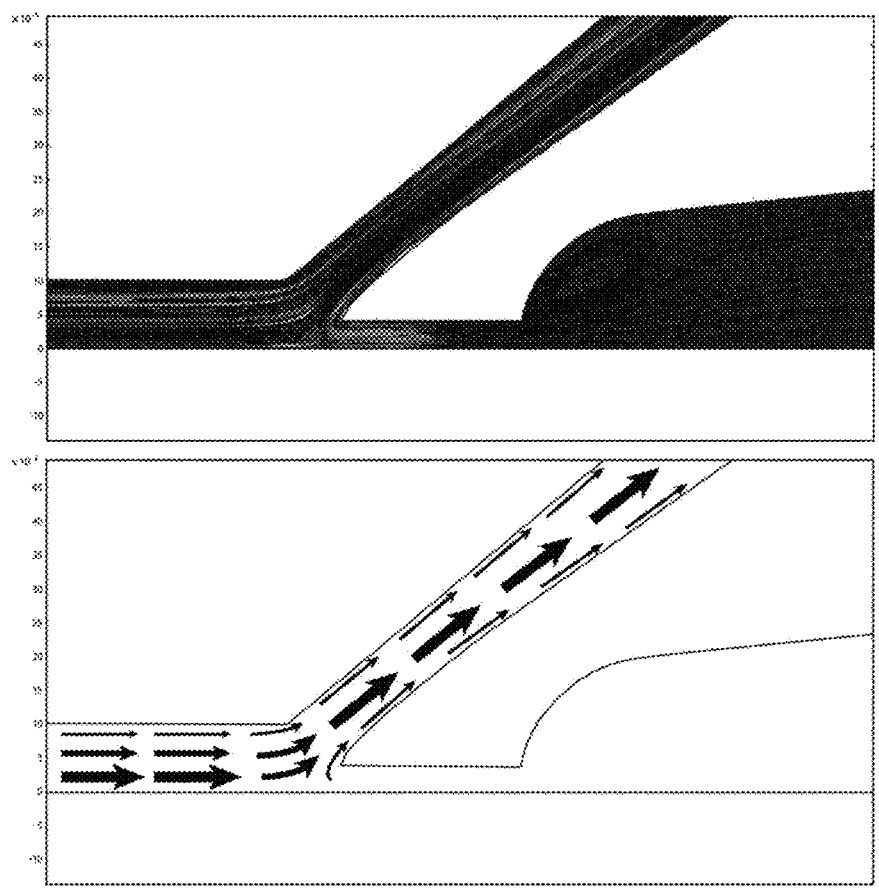

[FIG. 18]
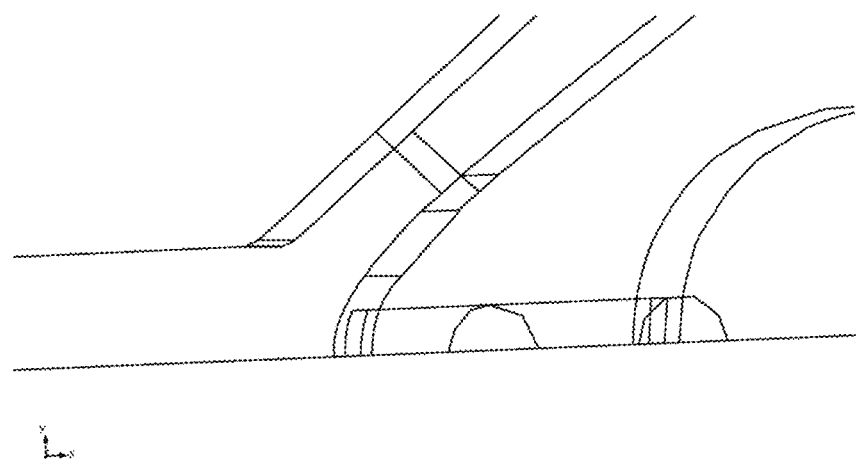
[FIG. 19]
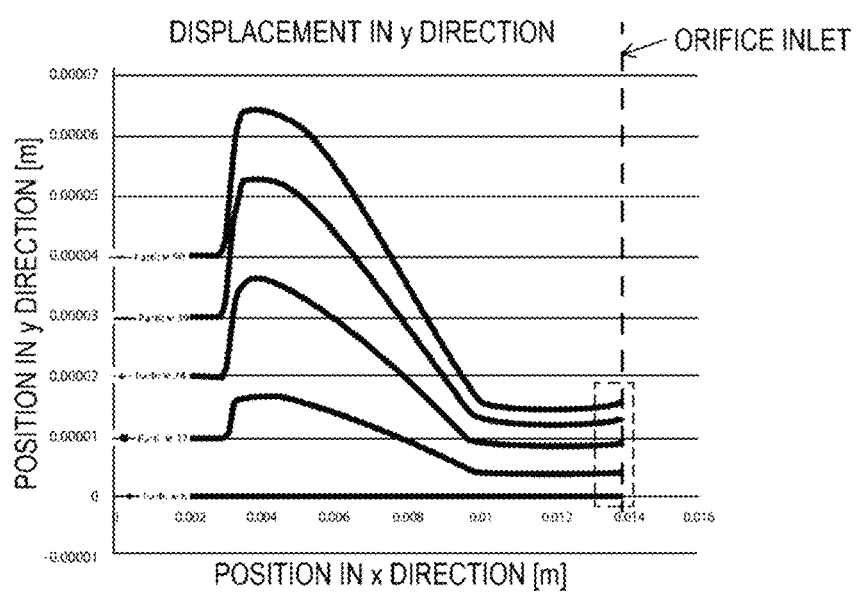

[FIG. 20]
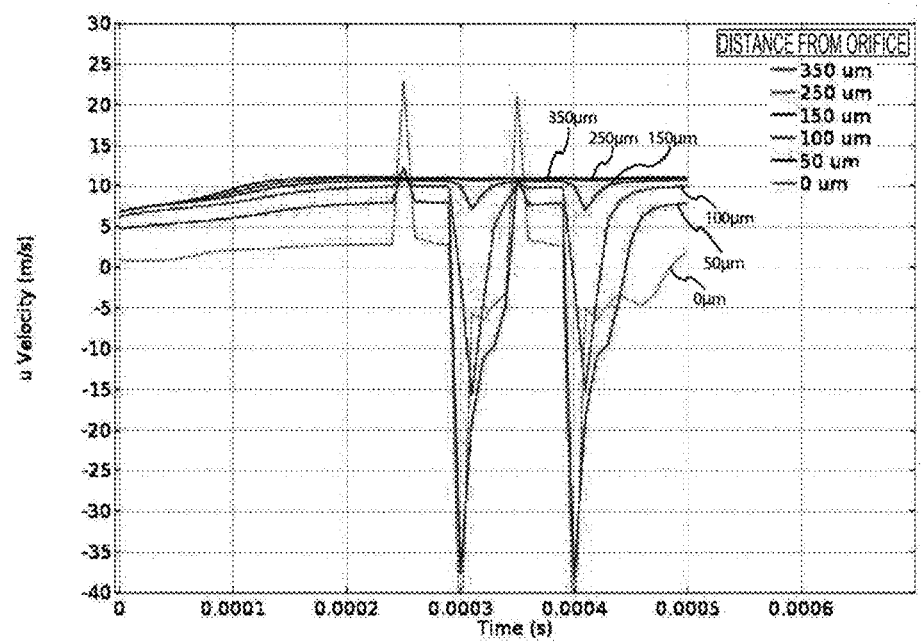
[FIG. 21]
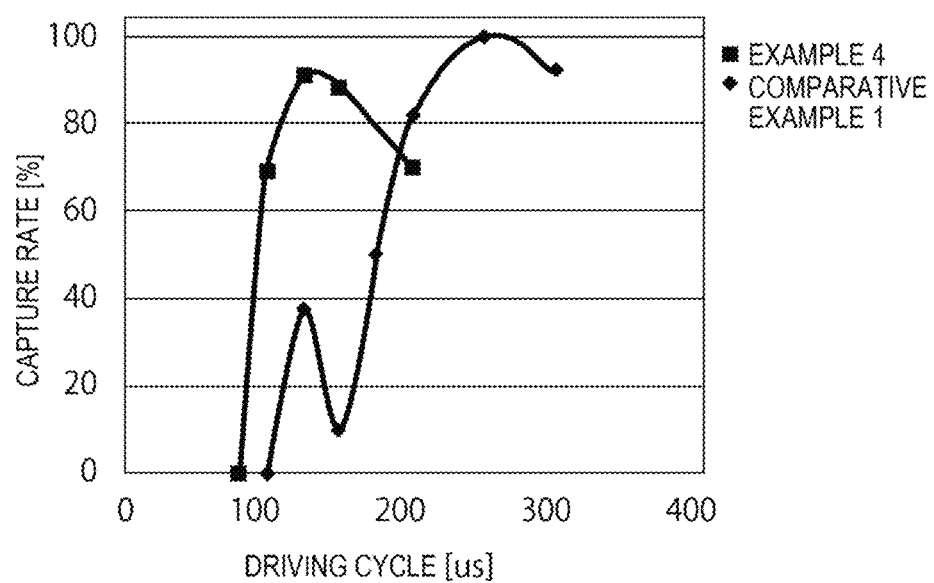

[FIG. 22]
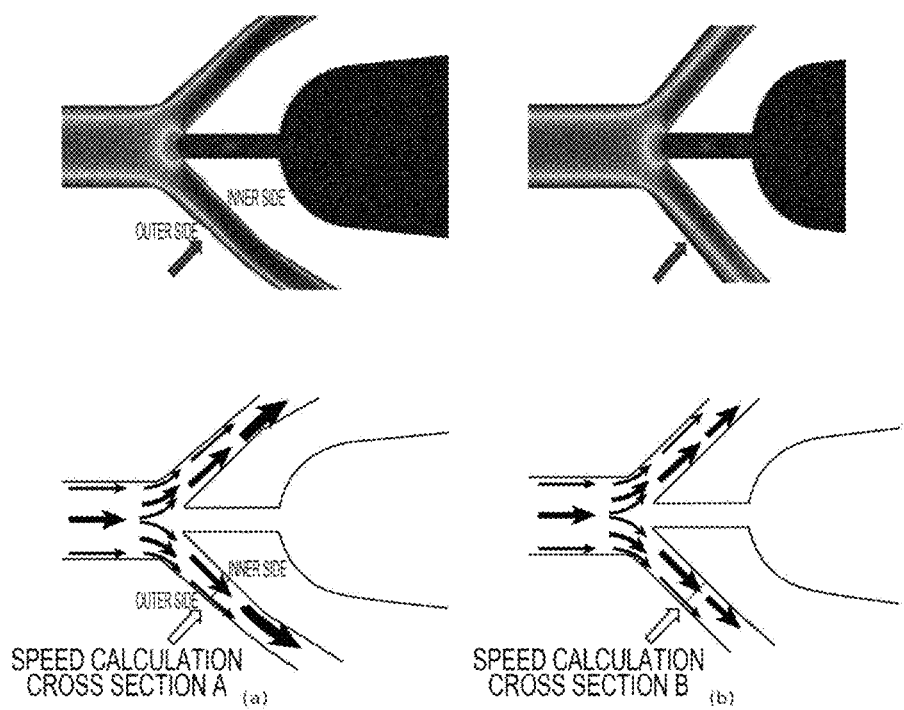

[FIG. 23]
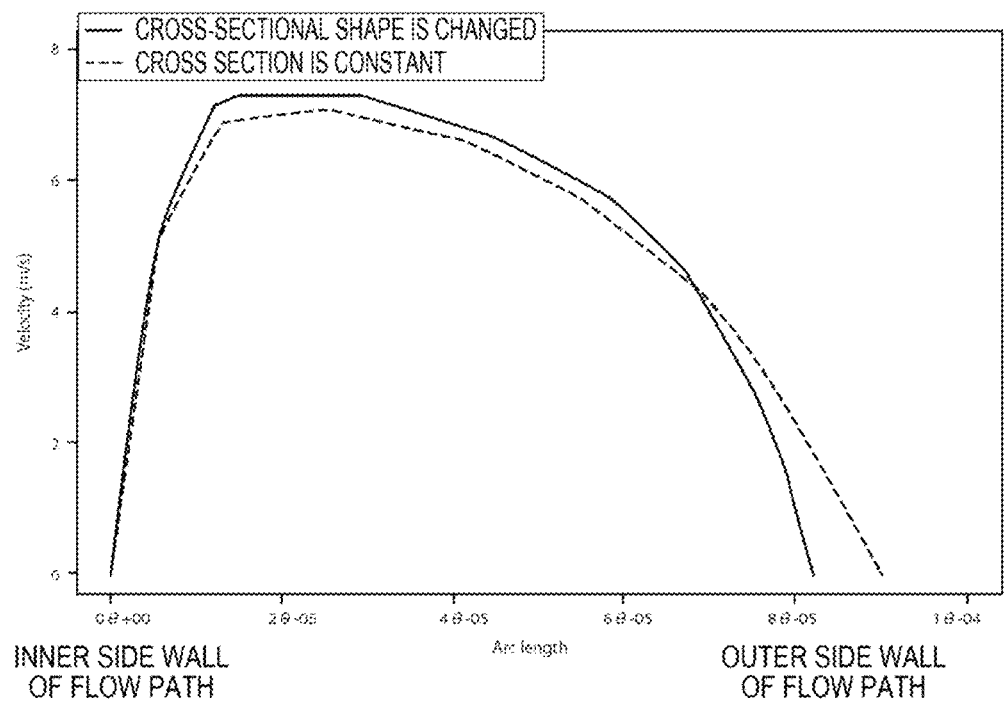
[FIG. 24]
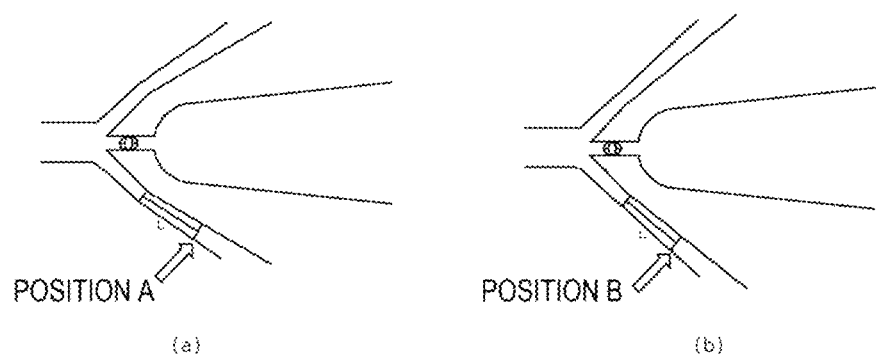

[FIG. 25]
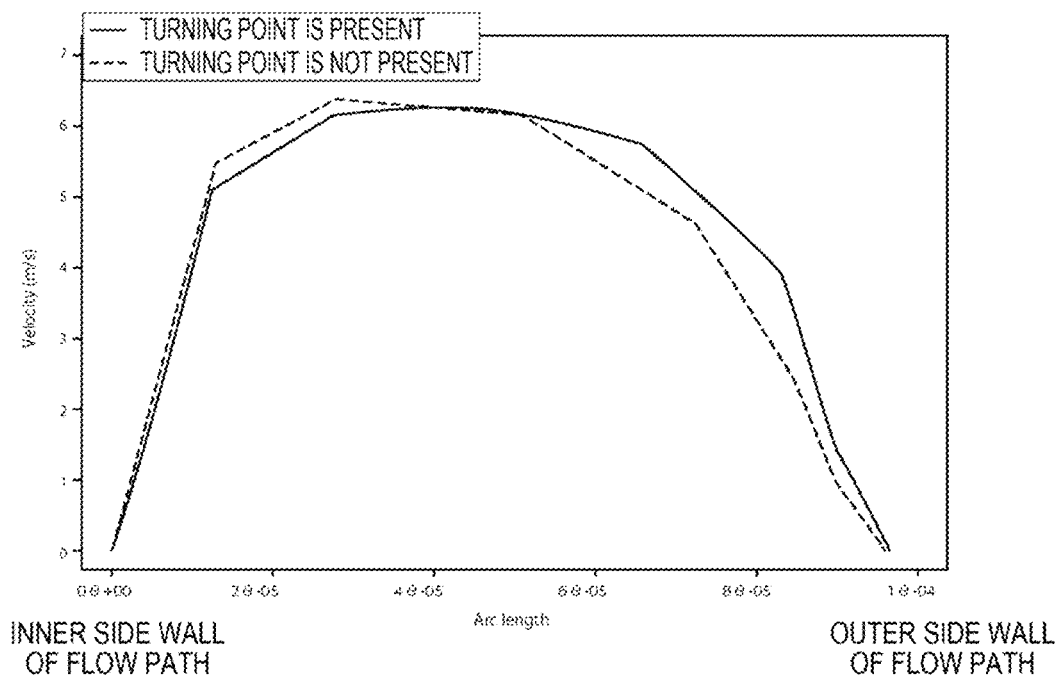

MICROCHIP AND MICROPARTICLE FRACTIONATING DEVICE

CROSS REFERENCE TO RELATED APPLICATIONS

The present application claims the benefit under 35 U.S.C. § 120 as a continuation application of U.S. application Ser. No. 16/483,070, filed on Aug. 2, 2019, now U.S. Pat. No. 11,305,281, which claims the benefit under 35 U.S.C. § 371 as a U.S. National Stage Entry of International Application No. PCT/JP2018/005148, filed in the Japanese Patent Office as a Receiving Office on Feb. 15, 2018, which claims priority to Japanese Patent Application Number JP2017-027583, filed in the Japanese Patent Office on Feb. 17, 2017, each of which is hereby incorporated by reference in its entirety.

TECHNICAL FIELD

The present technology relates to a microchip and a microparticle fractionating device. More particularly, the present technology relates to a microchip having a structure suitable for fractionating microparticles and a microparticle fractionating device including the microchip.

BACKGROUND ART

Various devices have been developed so far to fractionate microparticles. For example, in microparticle fractionating systems used in flow cytometers, laminar flows constituted of sample liquids containing cells and sheath liquids are discharged from orifices formed in flow cells or microchips. Predetermined vibrations are exerted on such a laminar flow to form droplets when the laminar flow is discharged. A direction of movement of each of the formed droplets is electrically controlled depending on whether the formed droplets contain or do not contain target microparticles so that the target microparticles can be fractionated.

Techniques for fractionating target microparticles in microchips without forming droplets as described above have also been developed. For example, the following Patent Literature 1 discloses "a microchip including a sample liquid introduction flow path through which a sample liquid containing microparticles flows, at least one pair of sheath liquid introduction flow paths which join the sample liquid introduction flow path from both sides thereof and introduce a sheath liquid around the sample liquid, a joining flow path which communicates with the sample liquid introduction flow path and the sheath liquid introduction flow path and in which liquids flowing through the flow paths join and flow, a negative pressure suction unit which communicates with the joining flow path and suctions and pulls microparticles to be collected, and at least one pair of disposal flow paths which are provided on both sides of the negative pressure suction unit and communicate with the joining flow path" (claim 1). In such a microchip, target microparticles are collected by the negative pressure suction unit through suction.

Also, the following Patent Literature 2 discloses "a method for fractionating microparticles including a procedure of fractionating microparticles in a liquid flowing through a main flow path into a branch flow path communicating with the main flow path by generating a negative pressure in the branch flow path, in which, in the procedure, a flow of a liquid leading from the branch flow path side to the main flow path side is formed in a communication port of the main flow path and the branch flow path" (claim 1). In such a fractionating method, entering of non-target particles or a sample liquid containing such non-target particles and a sheath liquid during a non-fractionating operation is suppressed due to the flow of the liquid leading to the main flow path side. Furthermore, Patent Literature 2 also discloses a microchip for fractionating microparticles capable of carrying out the method for fractionating microparticles (claim 9).

CITATION LIST

Patent Literature

PTL 1
JP 2012-127922A
[PTL 2]
JP 2014-036604A

SUMMARY

Technical Problem

In each of the microchips disclosed in the above-described Patent Literatures 1 and 2, when a liquid flowing through the main flow path does not contain target microparticles, such a liquid flows to, for example, the disposal flow path and such a liquid is guided into a predetermined flow path so that the target microparticles are collected only when the liquid flowing through the main flow path contains the target microparticles. In this way, each of the microchips has a section in which the flow of such a liquid changes, that is, a branch section configured to fractionate the target microparticles, depending on whether the liquid flowing through the main flow path contains the target microparticles.

A purpose of the present technology is to fractionate microparticles at a higher speed in a microchip having a branch section as described above.

Solution to Problem

The inventors of the present technology found that the above-described purpose can be attained by adopting a specific structure in the branch section.

That is, an embodiment of the present technology provides a microchip including: a main flow path through which a liquid containing microparticles flows; and a branch flow path that branches from the main flow path. A cross-sectional area of a portion of the main flow path is substantially constant up to a branch start position or decreases toward the branch start position, and a radius of curvature R of a side wall that connects a side wall of the main flow path and a side wall of the branch flow path is 0.5 mm or less and more than 0 mm.

In the microchip, an orifice section which is coaxial with the main flow path is provided; and the side wall that connects the side wall of the main flow path and the side wall of the branch flow path is between 0 μm and 300 μm from an orifice inlet to the orifice section.

In the microchip, the cross-sectional area of the portion of the main flow path leading up to the branch start position is substantially constant, or decreases, so that the radius of curvature R of the side wall begins the branching of the branch flow path from the main flow path.

In the microchip, a maximum cross-sectional area of the branch flow path is not more than half of the cross-sectional area of the main flow path at the branch start position.

In the microchip, the branch flow path branches from the main flow path in a Y shape.

In the microchip, a cross-sectional area of the branch flow path continuously decreases in an advancing direction of a flow of a liquid from a start position of the branch flow path.

In the microchip, a cross-sectional area of the branch flow path continuously decreases from a start position of the branch flow path to a predetermined position in an advancing direction of a flow of a liquid and continuously increases from the predetermined position in an advancing direction of a flow of a liquid.

In the microchip, a side wall of the branch flow path connected to the orifice section is bent toward an axis of the main flow path.

In the microchip, an orifice section which is coaxial with the main flow path is provided; and an angle of a side wall of the branch flow path connected to the orifice section with respect to an axis of the main flow path is 115 to 160 degrees.

In the microchip, an orifice section which is coaxial with the main flow path is provide; and an angle of a side wall of the branch flow path connected to the orifice section with respect to an axis of the main flow path is 125 to 160 degrees.

In the microchip, an orifice section which is coaxial with the main flow path is provided; and a pressure chamber communicates with the orifice section and a pressure in the pressure chamber is reduced or increased.

In the microchip, microparticles are guided into the orifice section by reducing a pressure in the pressure chamber or microparticles are advanced to the branch flow path by increasing a pressure in the pressure chamber.

In the microchip, an orifice section which is coaxial with the main flow path is provided; and a flow path configured to form a flow of a liquid leading from the orifice section to the main flow path is provided in the orifice section, such that microparticles are advanced to the branch flow path due to the formed flow.

In the microchip, the cross-sectional area of the portion of the main flow path leading up to the branch start position is constant up to the branch start position; and the cross-sectional area of a second portion of the main flow path increases as it extends from the branch start position along the side wall.

An embodiment of the present technology provides a microparticle sorting device able to receive a microchip, the microchip including: a main flow path through which a liquid containing microparticles flows; and a branch flow path that branches from the main flow path. A cross-sectional area of a portion of the main flow path is substantially constant up to a branch start position or decreases toward the branch start position, and a radius of curvature R of a side wall that connects a side wall of the main flow path and a side wall of the branch flow path is 0.5 mm or less.

The microparticle sorting device may include: a light irradiation unit configured to irradiate microparticles flowing through the main flow path with light; a detection unit configured to detect scattered light and/or fluorescence emitted from the microparticles; and a control unit configured to control an advancing direction of the microparticles flowing through the main flow path on the basis of data detected by the detection unit.

In the microparticle sorting device, the control unit may control a pressure in a pressure chamber communicating with the orifice section.

In the microparticle sorting device, the control unit may control a flow of a liquid in a flow path provided to form a flow of a liquid leading from the orifice section to the main flow path.

Advantageous Effects of Invention

According to the present technology, microparticles can be fractionated at a higher speed. Note that effects attained by the present technology are not necessarily limited to the effects described herein, but may be any of the effects described in the present specification.

BRIEF DESCRIPTION OF DRAWINGS

FIG. 1 is a schematic diagram of a microchip according to an embodiment of the present technology.

FIG. 2 is a diagram illustrating a branch section of the microchip according to an embodiment of the present technology.

FIG. 3 is a perspective view of the branch section of the microchip according to an embodiment of the present technology.

FIG. 4 is an enlarged diagram of the branch section of the microchip according to an embodiment of the present technology.

FIG. 5 is a schematic diagram of a microchip according to the related technology.

FIG. 6 is an enlarged diagram of a branch section of the microchip according to the related technology.

FIG. 7 is a diagram illustrating a simulation result of a flow in the branch section.

FIG. 8 is a diagram for describing results obtained by analyzing positions of microparticles in a y direction.

FIG. 9 is a diagram illustrating a simulation result of a flow of microparticles.

FIG. 10 is a graph for describing measurement results of flow rates in the vicinity of an orifice inlet in an x direction.

FIG. 11 is a diagram illustrating a simulation result of a flow in a branch section.

FIG. 12 is a diagram illustrating a particle tracking analysis result.

FIG. 13 is a diagram illustrating a simulation result of a flow in a branch section.

FIG. 14 is a diagram illustrating a particle tracking analysis result.

FIG. 15 is a diagram illustrating a simulation result of a flow in a branch section.

FIG. 16 is a diagram illustrating a particle tracking analysis result.

FIG. 17 is a diagram illustrating a simulation result of a flow in a branch section.

FIG. 18 is a diagram illustrating a particle tracking analysis result.

FIG. 19 is a diagram for describing results obtained by analyzing positions of microparticles in a y direction.

FIG. 20 is a graph for describing measurement results of flow rates in the vicinity of an orifice inlet in an x direction.

FIG. 21 is a graph for describing capture rates of microparticles.

FIG. 22 is a schematic diagram of a branch section.

FIG. 23 is a graph for describing a flow rate in a branch flow path.

FIG. 24 is a schematic diagram of a branch section.

FIG. 25 is a graph for describing a flow rate in a branch flow path.

DESCRIPTION OF EMBODIMENTS

Hereinafter, preferred embodiments for carrying out the present technology will be described. Note that the embodiments which will be described below illustrate representative embodiments of the present technology and thus the scope of the present technology is not narrowly interpreted. A description will be provided in the following order.
1. Description of Related Technology
2. First Embodiment (Microchip)
(1) Configuration of Microchip
(2) Configuration of Branch Section
3. Second Embodiment (Microparticle Fractionating Device)
4. Examples

1. Description of Related Technology

A technique for fractionating target microparticles in a microchip will be described below with reference to FIG. 5. FIG. 5 is a schematic diagram illustrating an example of such a microchip.

As illustrated in FIG. 5, a microchip 500 includes a sample liquid inlet 501 and a sheath liquid inlet 503. A sample liquid and a sheath liquid are introduced from such inlets into a sample liquid flow path 502 and a sheath liquid flow path 504. Microparticles are contained in such sample liquids.

A sheath liquid flowing through the sheath liquid flow path 504 joins with a sample liquid flowing from both sides of the sample liquid flow path 502 and a laminar flow in which the sample liquid is surrounded by the sheath liquid is formed. The laminar flow flows toward a branch section 507 through a main flow path 505.

The microchip 500 includes the branch section 507. The laminar flow flowing through the main flow path 505 and reaching the branch section 507 flows to a branch flow path 508 in the branch section 507. Furthermore, only when particles to be collected flowing and reaching the branch section 507, a flow to a particle fractionating flow path 509 is formed in the branch section 507 and the particles are collected. When the particles are suctioned into the particle fractionating flow path 509, the sample liquid constituting the laminar flow or the sample liquid and the sheath liquid constituting the laminar flow can also flow to the a particle fractionating flow path. In this way, the microparticles are fractionated in the branch section 507.

FIG. 6 is an enlarged diagram illustrating only one of the branch flow paths of the branch section 507. In other words, in FIG. 6, only half of the branch section 507 when the branch section 507 is cut along an axis of a main flow path thereof is illustrated. As illustrated in FIG. 6, the main flow path 505 and the particle fractionating flow path 509 communicate with each other via an orifice section 601 which is coaxial with the main flow path 505. The particles to be collected flow to the particle fractionating flow path 509 via the orifice section 601. Furthermore, in order to prevent particles not to be collected from entering the particle fractionating flow path 509 through the orifice section 601, the orifice section 601 can include a gate flow inlet 602 (not shown). A sheath liquid is introduced from the gate flow inlet 602 and a flow in a direction from the orifice section 601 to the main flow path 505 is formed so that the entering of the particles not to be collected to the particle fractionating flow path 509 can be prevented.

When particles are collected in a microchip having such a flow path structure, a flow flowing from the main flow path 505 to the particle fractionating flow path 509 via the orifice section 601 (hereinafter also referred to as a "flow at a time of particle collection") is formed. Such a flow is not form except when particles are collected. For example, a flow from the orifice section 601 to the main flow path 505 is formed by a sheath liquid introduced from the gate flow inlet 602, except when particles are collected.

After the flow at the time of particle collection is formed, a flow from the orifice section 601 to the main flow path 505 is formed again and thus a flow in the branch section 507 changes. Moreover, when other particles to be collected approach the vicinity of the orifice section after the flow in the branch section 507 is settled, a flow at a time of particle collection is formed again.

When the flow at the time of particle collection is formed again before the flow in the branch section 507 is settled, possibility of microparticles to be collected not being collected and/or possibility of microparticles not to be collected entering the particle fractionating flow path 509 increases. For this reason, in order to speed up the fractionating of microparticles, it is necessary to shorten a time from formation of a flow at a time of particle collection to stabilization of a flow in the branch section (hereinafter also referred to as a "continuous fractionable interval").

When the inventors of the present technology measured continuous fractionable intervals in microchips disclosed in Patent Literatures 1 and 2, the continuous fractionable intervals were at most about 200 µs. Thus, the inventors of the present technology examined a way to further shorten a continuous fractionable interval.

In the above-described examination, attention was paid to a structure of the branch section 507. In a flow path having the branch section 507, generally, a cross-sectional area of a main flow path thereof increases toward the branch section to minimize pressure loss in the branch flow path. Furthermore, a cross-sectional area of a flow path after branching may be equal to or larger than the cross-sectional area of the main flow path thereof. Such a flow path structure (hereinafter also referred to as a "general flow path structure") is generally adopted.

An example of the branch section having such a general flow path structure is as illustrated in FIG. 6. As illustrated in FIG. 6, in the general flow path structure, a liquid flowing in the main flow path 505 moves forward to the branch flow path 508. A width of the main flow path 505 increases toward the branch section. In other words, a cross-sectional area of the main flow path 505 increases toward the branch section. Furthermore, although not shown in FIG. 6, a cross-sectional area of the flow path after branching is set to be equal to or larger than the cross-sectional area of the main flow path.

The inventors of the present technology found that stagnation points (portions A and B in FIG. 6) are generated in a liquid flowing through a flow path in the branch section and that a flow rate of the liquid decreases in the vicinity of the stagnation points. In order to speed up the fractionating of particles, it is necessary to increase the flow rate of the liquid.

Also, the inventors of the present technology found that, particularly, after target microparticles are collected, microparticles stay at the stagnation point (B in FIG. 6) in front of the orifice section. Possibility of unnecessary particles being erroneously fractionated increases when the microparticles stay. For this reason, after the target microparticles are collected, it is necessary to settle a flow to the flow before collection as soon as possible and to cause the staying particles to flow to the branch flow path 508.

The inventors of the present technology also found that a core flow spreads in the vicinity of the stagnation points. In other words, it is also found that microparticles can flow through a portion deviating from a center of a main flow path and/or that a flow of a sample liquid can spread. When the core flow spreads, it is necessary to guide a larger amount of fluid into a predetermined flow path to fractionate target microparticles. As a result, fractionating efficiency is lowered. For this reason, it is necessary to suppress the spread of the core flow.

The inventors of the present technology found the above-described problems in the above-described branch section. According to the present technology, at least one of the above-described problems can be solved.

2. FIRST EMBODIMENT (MICROCHIP)

(1) Configuration of Microchip

FIG. 1 schematically illustrates a configuration of a microchip according to an embodiment of the present technology. Note that such a configuration is an example of a preferred embodiment and the microchip of the present technology is not limited to such a configuration. The configuration of the microchip according to an embodiment of the present technology will be described below with reference to FIG. 1.

A microchip 100 according to an embodiment of the present technology may include a flow path structure as illustrated in FIG. 1. The microchip 100 includes a sample liquid inlet 101 and a sheath liquid inlet 103. A sample liquid and a sheath liquid are introduced from such inlets into a sample liquid flow path 102 and a sheath liquid flow path 104.

A sheath liquid flowing through the sheath liquid flow path 104 joins with a sample liquid flowing from both sides of a sample liquid flow path 102, and a laminar flow in which the sample liquid is surrounded by the sheath liquid or a laminar flow in which the sample liquid is sandwiched between the sheath liquids is formed. Such laminar flows flow toward a branch section 107 though a main flow path 105.

The main flow path 105 may include a detection region 106. In the detection region 106, particles in a sample liquid can be irradiated with light. It can be determined whether such particles are to be collected on the basis of fluorescence and/or scattered light generated due to the irradiation of the light.

The microchip 100 includes the branch section 107. The laminar flow flowing through the main flow path 105 and reaching the branch section 107 flows to a branch flow path 108 in the branch section 107. Furthermore, only when particles to be collected flowing and reaching the branch section 107, a flow to a particle fractionating flow path 109 is formed in the branch section 107. The particles to be collected are suctioned into the particle fractionating flow path 109 using a flow to a particle fractionating flow path 109. When the particles are suctioned into the particle fractionating flow path 109, the sample liquid constituting the laminar flow or the sample liquid and the sheath liquid constituting the laminar flow can also flow to the particle fractionating flow path 109.

Note that, in FIG. 1, a laminar flow flowing to a branch flow path 108 can be discharged to the outside of the microchip at a branch flow path end 110. Furthermore, particles flowing to the particle fractionating flow path 109 and a sample liquid around the particles or a sample liquid and a sheath liquid around the particles can be discharged to the outside of the microchip at a particle fractionating flow path end 111.

(2) Configuration of Branch Section

FIG. 2 is an enlarged diagram of the branch section 107. As illustrated in FIG. 2, the main flow path 105 and the particle fractionating flow path 109 communicate with each other via an orifice section 201 which is coaxial with a main flow path thereof. In other words, particles to be collected flow to the particle fractionating flow path 109 through the orifice section 201.

The orifice section 201 may include a gate flow inlet 202. A sheath liquid or a sample liquid can be introduced into the orifice section through the gate flow inlet 202. A flow from the orifice section 201 toward the main flow path 105 is formed using the sheath liquid or the sample liquid introduced from the gate flow inlet 202. The entering of particles not to be collected into the particle fractionating flow path 109 can be prevented due to such a flow. The particles not to be collected flow to the branch flow path 108. Note that the gate flow inlet 202 may not include an orifice section. In this case, for example, a flow from the particle fractionating flow path 109 toward a main flow path thereof may be formed due to a change in pressure in the particle fractionating flow path 109 or such a pressure can be maintained so that a flow from the main flow path 105 to the particle fractionating flow path 109 is not formed. As a result, the entering of microparticles into the particle fractionating flow path 109 can be prevented. The particles not to be collected flow to the branch flow path 108.

In the microchip according to an embodiment of the present technology, the branch section 107 has a specific structure. In other words, in the microchip according to an embodiment of the present technology, (a) a cross-sectional area of a main flow path is constant up to a branch start position or continuously decreases toward such a branch start position and (b) a minimum cross-sectional area of a branch flow path is equal to or less than half of the cross-sectional area of the main flow path at the branch start position. The characteristics of (a) and (b) above will be described below with reference to FIG. 3.

Regarding Characteristic of (a)

FIG. 3 is a perspective view of the branch section 107. A cross-sectional area of the main flow path 105 is constant or continuously decreases toward the orifice section 201. A portion in which such a cross-sectional area starts to increase is referred to as a branch start position 304. In other words, the cross-sectional area of the main flow path 105 is constant or continuously decreases toward the branch start position.

Regarding Characteristic of (b)

In FIG. 3, cross sections 302 and 303 of a branch flow path are illustrated. In the cross section 303, a cross-sectional area of the branch flow path is minimized in the branch flow path 108. In the microchip according to an embodiment of the present technology, a minimum cross-sectional area of the branch flow path is not more than half of a cross-sectional area of the main flow path at the branch start position. In other words, in FIG. 3, a cross-sectional area of the cross section 303 is not more than half of a cross-sectional area of a cross section 301 of a main flow path at the branch start position 304. Also, in the microchip according to an embodiment of the present technology, a minimum cross-sectional area of a branch flow path may be, for example, ⅕ or more, preferably ¼ or more, and more preferably ⅓ or more of a cross-sectional area of the main flow path at the branch start position. The clogging of a liquid can be suppressed due to a lower limit of such a minimum cross-sectional area.

In the present technology, effects capable of fractionating microparticles at a higher speed are attained due to the characteristics of (a) and (b) above.

Also, in the microchip according to an embodiment of the present technology, a side wall configured to connect a side wall of the main flow path and a side wall of the branch flow path can be at between 0 μm and 300 μm from the orifice inlet. The microparticles can be fractionated at a high speed due to such a characteristic. Such a characteristic will be described below with reference to FIG. 4.

FIG. 4 is an enlarged diagram illustrating only one of the branch flow paths of the branch section 107. In other words, in FIG. 4, only half of the branch section when the branch section is cut along an axis of a main flow path thereof is illustrated.

In FIG. 4, a side wall 401 of the main flow path 105 and a side wall 402 of the branch flow path 108 are connected through a side wall 403. The side wall 403 refers to a side wall (hereinafter simply also referred to as a "connection side wall") configured to connect a side wall of a main flow path and a side wall of a branch flow path. The side wall 401 of the main flow path 105 refers to a side wall of a flow path up to the branch start position. The side wall 402 of the branch flow path 108 refers to a side wall subsequent to the side wall configured to connect the side wall of the main flow path and the side wall of the branch flow path.

In an embodiment of the present technology, the end of the connection side wall on the main flow path side thereof may be within 300 μm from the orifice inlet. In other words, the branch start position may be within 300 μm from the orifice inlet. Note that, in the present technology, the orifice inlet is indicated by reference numeral 404 in FIG. 4. Furthermore, in FIG. 4, a distance from the orifice inlet refers to a distance from the orifice inlet on an X axis (an axis of the main flow path). In other words, in FIG. 4, the end of the connection side wall on the main flow path thereof being within 300 μm from the orifice inlet refers to a distance 1 being within 300 μm or less. This can also be said that a cross-sectional area of the main flow path is constant or the cross-sectional area thereof continuously decreases until the main flow path reaches a distance within 300 μm from the orifice inlet. Furthermore, it can also be said that a position in which a cross-sectional area of a flow path changes to increase is a branch start position and the branch start position is within 300 μm from the orifice inlet.

The end of the connection side wall on the main flow path side is within 300 μm from the orifice inlet so that transition in a direction of the side wall from the side wall of the main flow path to the side wall of the branch flow path starts immediately before an orifice. Microparticles can be fractionated at a higher speed by causing the transition to start immediately before the orifice.

The distance 1 may be preferably 280 μm or less, more preferably 250 μm or less, and even more preferably 200 μm or less.

Also, in an embodiment of the present technology, the end of the connection side wall on the main flow path side may be within 300 μm from the orifice inlet and an end of the connection side wall on a branch flow path side may be at a distance of 0 μm or more from the orifice inlet. This means that, in FIG. 4, the distance 1 is 300 μm or less and a distance 2 is 0 μm or more.

The end of the connection side wall on the main flow path is within 300 μm from the orifice inlet and the end of the connection side wall on the branch flow path side is at the distance of 0 μm or more from the orifice inlet so that the transition in the direction of the side wall from the side wall of the main flow path to the side wall of the branch flow path starts and ends immediately before the orifice. Such a transition starts and ends immediately before the orifice so that microparticles can be fractionated at a higher speed.

The distance 2 may be preferably 10 μm or more, more preferably 20 μm or more, and even more preferably 30 μm or more.

In an embodiment of the present technology, the connection side wall may be a curved surface or a flat surface and may be preferably a curved surface. When the connection side wall is a curved surface, a radius of curvature R of the connection side wall may be 0.5 mm or less, more preferably 0.4 mm or less, and even more preferably 0.3 mm or less. The radius of curvature R may be more than 0 mm. In some embodiments of the present technology, the radius of curvature R may be 0.5 mm or less and more than 0 mm. With such a radius of curvature, microparticles can be fractionated at a higher speed. When the connection side wall is a flat surface, the flat surface may be constituted of a plurality of flat surfaces or may be constituted of one flat surface such that transition is made stepwise from a direction of the side wall of the main flow path to a direction of the side wall of the branch flow path.

In an embodiment of the present technology, the maximum cross-sectional area of the branch flow path may be not more than half of the cross-sectional area of the main flow path at the branch start position. The maximum cross-sectional area refers to a maximum cross-sectional area of the branch flow path on the orifice from a position of the branch flow path having the minimum cross-sectional area. For example, in FIG. 3, such a maximum cross-sectional area refers to a cross-sectional area indicated by reference numeral 302. Particularly, the microchip may have a structure in which the maximum cross-sectional area of the branch flow path is not more than half of the cross-sectional area of the main flow path at the branch start position and the cross-sectional area of the branch flow path continuously decreases from the start position of the branch flow path in an advancing direction of a flow of a liquid. With such a structure, the fractionating of particles can be speeded up.

Also, the maximum cross-sectional area may be, for example, ⅕ or more, preferably ¼ or more, and more preferably ⅓ or more of the cross-sectional area of the main flow path at the branch start position. With such a lower limit of the minimum cross-sectional area, the clogging of a liquid can be suppressed.

In an embodiment of the present technology, the branch flow path may have a structure in which a cross-sectional area of the branch flow path from the start position of the branch flow path continuously decreases in an advancing direction of a flow of a liquid. Here, the start position of the branch flow path is the same as a position of the end of the connection side wall on the branch flow path side. The decrease in the cross-sectional area of the branch flow path may continue to a predetermined position of the branch flow path. Although the predetermined position may be appropriately set by a person of ordinary skill in the art so that effects which will be described below are attained, for example, the predetermined position may be within 1000 μm and preferably 300 μm from the start position of the branch flow path. Furthermore, in an embodiment of the present technology, the branch flow path may have a structure in which the branch flow path continuously decreases from the branch start position to the predetermined position thereof in an advancing direction of a flow of a liquid and continuously increase from the predetermined position thereof in an advancing direction of a flow of a liquid. In other words, the microchip according to an embodiment of the present technology may have a structure in which a cross-sectional area of the branch flow path continuously decreases from a position in which the cross-sectional area of the branch flow path is maximized in an advancing direction of a flow of a liquid, the cross-sectional area of the branch flow path is maximized, and then a cross-sectional area of a flow path continuously increases in the advancing direction of the flow of the liquid again (in the present specification, a branch flow path in the branch flow path which is on a branch flow path end side from a position in which a cross-sectional area of the branch flow path is minimized is also referred to as a "flow path after branching."). With such a structure, an effect of preventing stagnation points from occurring in the branch flow path and/or an effect of increasing a flow rate in the vicinity of a wall surface of the branch flow path can be attained. As a result, the fractionating of particles can be speeded up.

In an embodiment of the present technology, the branch flow path may branch from the main flow path to one or two or more branch flow paths. In the case of branching into one branch flow path, for example, a main flow path and an orifice section are coaxial with each other and a branch flow path may branch from its axis. A main flow path may branch into two branch flow paths. The two branch flow paths preferably branch in a Y shape. A flow of a liquid in a branch flow path can be smoother by branching a flow path into a Y shape. The orifice section may be provided on a center of the Y-shaped branched branch flow path. Furthermore, a main flow path may branch into three branch flow paths or four branch flow paths.

In an embodiment of the present technology, the cross-sectional area of the flow path after branching may continuously increase from the position in which the cross-sectional area of the branch flow path is minimized in a direction in which the liquid flows. Thus, pressure loss is reduced so that a high flow rate at a low pressure is possible. The cross-sectional area of the flow path after branching may continuously increase to a predetermined position. Although the predetermined position may be appropriately set by a person of ordinary skill in the art, for example, as illustrated in FIG. 1, the predetermined position may be a place in which a flow path after branching is bent toward the branch flow path end 110.

In an embodiment of the present technology, a side wall of the branch flow path connected to the orifice section may be bent toward the axis of the main flow path. In the branch flow path, a maximum flow rate section is located on the particle fractionating flow path side rather than a center of a flow path in some cases. In other words, a difference may occur between a flow rate in the branch flow path on the particle fractionating flow path side and a flow rate on an opposite side thereof. As a result, stagnation may occur in the branch flow path. The side wall of the branch flow path is bent toward the axis of the main flow path so that the difference between the flow rate in the branch flow path on the particle fractionating flow path side and the flow rate on the opposite side thereof decreases, that is, the imbalance between the flow rates is eliminated, and thus occurrence of stagnation in the branch flow path can be suppressed. The flow rate in the branch flow path can be improved and microparticles can be fractionated at a higher speed by suppressing the occurrence of stagnation.

In an embodiment of the present technology, an angle of the side wall of the branch flow path connected to the orifice section with respect to the axis of the main flow path may be preferably 115 to 160 degrees and more preferably 125 to 160 degrees. Such an angle is 115 degrees or more so that occurrence of stagnation in the vicinity of the orifice section inlet can be prevented. Furthermore, such an angle is 125 degrees or more so that collisions of particles to the orifice section inlet can be suppressed. Such an angle is 160 degrees or less so that a microchip can be more easily manufactured.

In the microchip according to an embodiment of the present technology, a pressure chamber may communicate with the orifice section. The pressure chamber may be included in the particle fractionating flow path or the particle fractionating flow path itself may function as a pressure chamber. A pressure in such a pressure chamber can be reduced or increased. A pressure in the pressure chamber is reduced so that microparticles are guided into the orifice section or a pressure in the pressure chamber is increased so that entering of microparticles into the orifice section is prevented. Only particles to be collected can be fractionated by adjusting a pressure in the pressure chamber as described above.

Also, in the microchip according to an embodiment of the present technology, a flow path configured to form a flow (in the present specification, also referred to as a "gate flow") of a liquid leading from the orifice section to the main flow path may be provided in the orifice section and the liquid can advance to the particle fractionating flow path of microparticles due to the formed flow. Entering of particles not to be collected into the orifice section can be prevented by such a gate flow. In an embodiment of the present technology, the gate flow may be introduced into the orifice section at all times while particles are being fractionated and a pressure in the pressure chamber can be reduced only when microparticles are guided into the particle fractionating flow path. A flow stronger than a flow from the orifice section to the main flow path caused by the gate flow is formed from the main flow path to the particle fractionating flow path due to a decrease in the pressure, and thus target particles can be fractionated in the particle fractionating flow path.

In an embodiment of the present technology, microparticles may be appropriately selected by a person of ordinary skill in the art. In an embodiment of the present technology, microparticles may include biological microparticles such as cells, microorganisms, and liposomes, synthetic particles such as latex particles, gel particles, and industrial particles, and the like. The biological microparticles may include chromosomes, liposomes, mitochondria, organelles (cell organelles), and the like constituting various cells. The cells may include animal cells (hemocyte cells and the like) and plant cells. The microorganisms may include bacteria such as *Escherichia coli*, viruses such as tobacco mosaic virus, and fungi such as yeast. In addition, the biological microparticles may also include biological macromolecules such as nucleic acids, proteins, and complexes thereof. The synthetic particles may be, for example, particles made of organic or inorganic polymeric materials, metals, or the like. The organic polymeric materials may include polystyrene, styrene, divinylbenzene, polymethyl methacrylate, and the like. The inorganic polymeric materials may include glass, silica, magnetic materials, and the like. The metals may include gold colloid, aluminum, and the like. A shape of microparticles may be generally a spherical shape or a substantially spherical shape, or a non-spherical shape. A size and mass of microparticles may be appropriately selected by a person of ordinary skill in the art depending on a size of a flow path of a microchip. On the other hand, the size of the flow path of the microchip can also be appropriately selected depending on a size and mass of microparticles. In an embodiment of the present technology, a chemical or biological label, for example, a fluorescence dye or the like is attached to microparticles as necessary. Such microparticles can be more easily detected using such a label. A label to be attached can be appropriately selected by a person of ordinary skill in the art.

The microchip according to an embodiment of the present technology may be manufactured by a known method in the related art. The microchip according to an embodiment of the present technology can be manufactured, for example, by bonding two substrates in which flow paths are formed as described above. Flow paths may be formed on both of the two substrates or may be formed only in one of the substrates. In order to easily adjust a position when substrates are bonded, it is desirable that flow paths are formed only in one of the substrates.

As materials used to form the microchip according to an embodiment of the present technology, known materials in the related art may be used. Examples of the materials include polycarbonate, cycloolefin polymers, polypropylene, polydimethylsiloxane (PDMS), polymethyl methacrylate (PMMA), polyethylene, polystyrene, glass, and silicone, but the present technology is not limited thereto. Particularly, polymer materials such as polycarbonate, cycloolefin polymers, and polypropylene are particularly preferable because the polymer materials have excellent processability and can manufacture a microchip inexpensively using a forming device.

3. SECOND EMBODIMENT (MICROPARTICLE FRACTIONATING DEVICE)

A microparticle fractionating device (also referred to herein as a microparticle sorting device) according to an embodiment of the present technology includes a main flow path through which a liquid containing microparticles flows, a branch flow path configured to branch from the main flow path, an orifice section which is coaxial with the main flow path, and a microchip in which a cross-sectional area of the main flow path is constant up to a branch start position or continuously decreases toward the branch start position and a minimum cross-sectional area of the branch flow path is half or less of the cross-sectional area of the main flow path at the branch start position. Since such a microchip has been described in 2. First embodiment described above, a description of the microchip will be omitted.

The microparticle fractionating device according to an embodiment of the present technology may include a light irradiation unit configured to irradiate microparticles flowing through the main flow path with light, a detection unit configured to detect scattered light and/or fluorescence emitted from the microparticles, and a control unit configured to control an advancing direction of microparticles flowing through the main flow path on the basis of data detected by the detection unit. The light irradiation unit, the detection unit, and the control unit will be described below.

In an embodiment of the present technology, the light irradiation unit irradiates microparticles flowing through the main flow path with light (excitation light). The light irradiation unit may include a light source configured to emit excitation light and objective lenses configured to collect the excitation light to microparticles flowing through the main flow path. The light source may be appropriately selected from laser diodes, second harmonic generation (SHG) lasers, solid lasers, gas lasers, high brightness light-emitting diodes (LEDs), and the like in accordance with the purpose of analysis. The light irradiation unit may include other optical elements as necessary in addition to the light source and the objective lenses.

In an embodiment of the present technology, the detection unit detects scattered light and/or fluorescence emitted from the microparticles by light irradiation using the light irradiation unit. The detection unit may include condenser lenses configured to collect fluorescence and/or scattered light emitted from microparticles and a detector. Photomultiplier tubes (PMTs), photodiodes, charge-coupled devices (CCDs), complementary metal-oxide-semiconductors (CMOSs), and the like are used as such a detector, but the present technology is not limited thereto. The detection unit may include other optical elements as necessary in addition to the condenser lenses and the detector.

Fluorescence detected by the detection unit may be fluorescence generated from fluorescence generated from microparticles themselves, substances labeled on microparticles, for example, fluorescence substances, and the like, but the present technology is not limited thereto. Scattered light detected by the detection unit may be forward scattered light, side scattered light, Rayleigh scattering, and/or Mie scattering, but the present technology is not limited thereto.

In an embodiment of the present technology, the control unit controls whether microparticles flowing through the main flow path are advanced to the branch flow path or suctioned into the particle fractionating flow path on the basis of data detected by the detection unit. Fluorescence and scattered light detected by the detection unit can be converted into electric signals. In other words, the microparticle fractionating device according to an embodiment of the present technology may include an electric signal conversion unit. The electric signal conversion unit may be included in the control unit and may not be included in the control unit. The control unit may receive such electric signals and determine optical characteristics of microparticles on the basis of the electric signals. When microparticles are to be collected, the control unit may change a flow in a flow path on the basis of the result of the determination so that the microparticles advance to a microparticle fractionating flow path through the orifice section. The change in the flow can be made, for example, by reducing a pressure in the pressure chamber. Furthermore, after microparticles are collected, the control unit may change the flow in the flow path again. Such a change of the flow again can be made by increasing a pressure in the pressure chamber. In other words, the control unit may control a pressure in the pressure chamber communicating with the orifice section on the basis of data detected by the detection unit. Furthermore, the control unit may control a flow of a liquid in a flow path provided to form a flow of the liquid leading from the orifice section to the main flow path. The control unit may have the same function as that of a drive unit disclosed in JP 2014-036604A.

EXAMPLE

4. Example

4-1. Comparative Example 1

Microchip Including Branch Section with General Flow Path Structure

A flow of a liquid in a microchip (hereinafter referred to as a "microchip of Comparative Example 1") including a branch section with a flow path structure in which a cross-sectional area of a main flow path increases toward a branch section and a cross-sectional area of a flow path after branching is the cross-sectional area or more of the main flow path is simulated using COMSOL Multiphysics v5.1. The branch section is as illustrated in FIG. 6. A position of the branch section in which the cross-sectional area of the main flow path increases is more than 300 μm away from an orifice inlet.

Analysis conditions in the above-described simulation are as follows.

Flow rate of sheath liquid: 5 ml/minute
Flow rate of sample liquid: 0.25 ml/minute
Flow rate of gate flow: 0.3 ml/minute
Outlet pressure: atmospheric pressure
Discharge rate from particle fractionating flow path end: 0.045 ml/minute FIG. 7 illustrates a result obtained by simulating a flow in the branch section under the above-described conditions. An upper diagram in FIG. 7 illustrates a simulation result and a lower diagram in FIG. 7 is a diagram which schematically illustrates a flow rate obtained through the simulation result using arrows. In the lower diagram in FIG. 7, the arrows indicate a flow of a liquid. Furthermore, a flow rate is higher when a thickness of an arrow is thicker. Note that, since a thickness and a direction of an arrow representing a flow rate are simplified for easier understanding, accurate direction and flow rate are not reflected (the same applies to other diagrams). As illustrated in FIG. 7, a vortex flow is formed in the vicinity of an orifice. It is considered that the vortex flow is caused by a separation flow being formed. Furthermore, as illustrated in FIG. 7, it is also confirmed that a flow rate decreases toward the orifice. It is considered that the formation of the vortex flow and the decrease of the flow rate are caused by the increase in the cross-sectional area of the main flow path toward the orifice inlet.

Subsequently, a particle tracking analysis was performed on a flow of microparticles using the above-described software. FIG. 8 illustrates analysis results. As illustrated in FIG. 8, in a portion immediately before the orifice (a portion surrounded by a dotted line in the vicinity of 0.014 m of a position in an x direction in FIG. 8), it was seen that particles spread in a y direction (when a y direction illustrated in FIG. 4, that is, a direction in which a liquid of the main flow path flows is assumed to be an x direction, a direction which is perpendicular to the x direction is referred to as a y direction).

Subsequently, a flow of microparticles when a piezoelectric element (PZT) provided in the particle fractionating flow path was simulated. In other words, a volume in the particle fractionating flow path (particularly, a volume of a pressure chamber) is increased by driving such a piezoelectric element. The pressure in the particle fractionating flow path is reduced due to a crease in the volume and thus a flow leading from the main flow path to the particle fractionating flow path via the orifice inlet is formed. A flow of microparticles when such a flow is formed was simulated.

A shape of a change in a voltage applied to the piezoelectric element due to such an increase in the volume was a pulse waveform. Driving conditions for the piezoelectric element were Tf/Tr: 15 μs, PW: 50 μs, pulse interval: 300 μs, and PZT displacement: 1 μm. Tf is a falling time of a voltage in a pulse waveform and Tr is a rising time of the voltage in the pulse waveform. PW is a time interval in which an amount of PZT displacement is 0.5 μm or more. At the falling time, the volume increases and thus a flow is formed to suction microparticles into the particle fractionating flow path. At the rising time, the volume decreases, the suctioning flow disappears, and thus a flow leading from an orifice section to the main flow path is formed.

FIG. 9 illustrates a result of the simulation. As illustrated in FIG. 9, when the PZT is started up, a jet occurs in the orifice inlet and a swirling vortex occurs in the vicinity of the orifice inlet. Furthermore, particles along with this can also exhibit a behavior of moving in a direction of an abrupt expanding section (a portion in which the cross-sectional area of the main flow path becomes large) of a flow path. As a result, microparticles not to be separated stay at the branch section. When the piezoelectric element is driven again before the microparticles not to be fractionated flow to the branch flow path and the swirling vortex disappears, possibility of microparticles to be fractionated not being fractionated increases and possibility of microparticles not to be fractionated being fractionated also increases. For this reason, in order to fractionate microparticles at a higher speed, it is considered that it is necessary to flow the microparticles not to be separated to the branch flow path as quickly as possible and eliminate the swirling vortex.

Next, FIG. 10 illustrates results obtained by measuring flow rates in an x direction at a predetermined distance from the orifice inlet. In FIG. 10, a portion in which each of the flow rates rapidly increases in a positive direction indicates a time at which microparticles have been suctioned into the orifice. After the flow rate rapidly increases in the positive direction, the flow rate has a negative value, particularly in the vicinity of the orifice in accordance with a change in flow. After that, it takes about 200 μs to return the flow rate to a state before of suctioning microparticles. In other words, it takes about 200 μs to settle the flow rate. It is considered that it takes about 200 μs to settle the flow rate because the problems described above with reference to FIGS. 7 to 9 as well as a slow flow rate in the abrupt expanding section. It is considered that microparticles can be fractionated at a higher speed by shortening a time taken for settlement.

4-2. Example 1

Microchip According to Embodiment of the Present Technology

A flow of a liquid in a microchip (hereinafter referred to as a "microchip of Example 1") including a branch section with a flow path structure in which a cross-sectional area of a main flow path is constant up to a branch start position and a minimum cross-sectional area of a branch flow path is not more than half of the cross-sectional area of the main flow path at the branch start position was simulated using COMSOL Multiphysics v5.1. The branch section is as illustrated in FIG. 11. In the microchip, an angle of the branch flow path with respect to the main flow path was 110 degrees. A width of the main flow path was 200 μm and a width of an inlet of the branch flow path was 90 μm. In the branch section, a side wall configured to connect a side wall of the main flow path and a side wall of the branch flow path was at between 0 μm and 300 μm from an orifice inlet.

Analysis conditions in the above-described simulation are as follows.

Flow rate of sheath liquid: 5 ml/minute
Flow rate of sample liquid: 0.25 ml/minute
Flow rate of gate flow: 0.2 to 0.6 ml/minute
Outlet pressure: atmospheric pressure
Discharge rate from particle fractionating flow path end: 0.045 ml/minute FIG. 11 illustrates a result obtained through simulation. An upper diagram in FIG. 11 illustrates a simulation result and a lower diagram in FIG. 11 is a diagram which schematically illustrates a flow rate obtained through the simulation result using arrows. As illustrated in FIG. 11, a vortex flow does not occur in the vicinity of the side wall configured to connect the side wall of the main flow path and the side wall of the branch flow path (in the vicinity of a turning point from the main flow path to the branch flow path). Furthermore, a flow rate in the vicinity of an orifice was improved as compared to Comparative Example 1. On the other hand, a vortex occurred in front of the orifice inlet.

Also, a flow of microparticles was subject to a particle tracking analysis using the above-described software. FIG. 12 illustrates an analysis result. As illustrated in FIG. 12, it was confirmed that particles flowing in the vicinity of a center of the main flow path hit walls without being bent and stay near the walls. It is considered that this is due to the fact that an angle between the main flow path and the branch flow path is 110 degrees and is close to a right angle.

4-3. Example 2

Microchip According to Embodiment of the Present Technology

Simulation was performed under the same conditions as in Example 1 except that an angle of a branch flow path with respect to a main flow path was set to be 150 degrees. A branch section used in such simulation is as illustrated in FIG. 13.

FIG. 13 illustrates a result obtained through simulation. An upper diagram in FIG. 13 illustrates a simulation result and a lower diagram in FIG. 13 is a diagram which schematically illustrates a flow rate obtained through the simulation result using arrows. As illustrated in FIG. 13, a vortex flow does not occur in the vicinity of the side wall configured to connect the side wall of the main flow path and the side wall of the branch flow path (in the vicinity of a turning point from the main flow path to the branch flow path). Furthermore, a flow rate in the vicinity of an orifice was improved as compared to Comparative Example 1. A vortex did not occur in front of an orifice inlet seen in the simulation result of Example 1 either.

Next, a flow of microparticles was subject to a particle tracking analysis using the above-described software. FIG. 14 illustrates an analysis result. As illustrated in FIG. 14, stagnation of particles in the vicinity of an orifice was not observed when a flow rate of a gate flow was 0.6 ml/minute.

4-4. Example 3

Microchip According to Embodiment of the Present Technology

Simulation was performed under the same conditions as in Example 1 except that an angle of a branch flow path with respect to a main flow path was set to be 120 degrees. A branch section used in such simulation is as illustrated in FIG. 15.

FIG. 15 illustrates a result obtained through simulation. An upper diagram in FIG. 15 illustrates a simulation result and a lower diagram in FIG. 15 is a diagram which schematically illustrates a flow rate obtained through the simulation result using arrows. As illustrated in FIG. 15, a vortex flow does not occur in a turning point portion from a main flow path to a branch flow path. Furthermore, a flow rate in the vicinity of an orifice was improved as compared to Comparative Example 1. A vortex did not occur in front of an orifice inlet seen in the simulation result of Example 1 either.

Next, a flow of microparticles was subject to a particle tracking analysis using the above-described software. FIG. 16 illustrates an analysis result. As illustrated in FIG. 16, it was confirmed that particles flowing in the vicinity of a center of the main flow path hit walls of the branch flow path without being bent and stay.

4-5. Example 4

Microchip According to Embodiment of the Present Technology

Simulation was performed under the same conditions as in Example 1 except that an angle of a branch flow path with respect to a main flow path was set to be 130 degrees immediately after branching and then was set to be 135 degrees. A branch section used in such a simulation is as illustrated in FIG. 17. As illustrated in FIG. 17, the angle of the branch flow path with respect to the main flow path immediately after the branching is 130 degrees. After that, the branch flow path is bent so that such an angle is 135 degrees. In other words, the branch flow path is bent toward a particle fractionating flow path.

FIG. 17 illustrates a result obtained through simulation. An upper diagram in FIG. 17 illustrates a simulation result and a lower diagram in FIG. 17 is a diagram which schematically illustrates a flow rate obtained through the simulation result using arrows. As illustrated in FIG. 17, a vortex flow does not occur in a turning point portion from a main flow path to a branch flow path. Furthermore, a flow rate in the vicinity of an orifice was improved as compared to Comparative Example 1. A vortex did not occur in front of an orifice inlet seen in the simulation result of Example 1 either.

Next, a flow of microparticles was subject to a particle tracking analysis using the above-described software. FIG. 18 illustrates an analysis result. As illustrated in FIG. 18, stagnation of particles in the vicinity of an orifice was not observed.

Also, since an interval between the branch flow path and the particle fractionating flow path is wider than that of Example 2, processing is easier.

A flow of microparticles was analyzed like in Comparative Example 1. FIG. 19 illustrates analysis results. As illustrated in FIG. 19, it was shown that particles did not spread in a y direction immediately before an orifice. In other words, in a microchip of Example 4, the spread of a core flow is suppressed.

A flow rate in an x direction at a predetermined distance from an orifice inlet was measured like in Comparative Example 1. FIG. 20 illustrates measurement results. As illustrated in FIG. 20, a flow rate in the x direction returned to a state before particles were suctioned at approximately 100 µs after the particles were suctioned into the orifice. In other words, a settling time is approximately 100 µs. Furthermore, it can be seen that a jet flow also affects a portion from the orifice inlet to 350 µm.

The microchip of Example 4 and the microchip of Comparative Example 1 were actually subject to a microparticle fractionating experiment. In such an experiment, a capture rate of microparticles at a pulse drive interval, that is, various particle fractionating intervals, was measured. A PZT drive waveform was set to be Tf/Tr 15 µs and PW 35

μs. FIG. 21 illustrates measurement results. As illustrated in FIG. 21, when the microchip of Example 4 is used, a capture rate at 100 to 125 μs is higher than the microchip of Comparative Example 1. From this result, it was confirmed that a continuous fractionable interval can be set to be approximately 100 μs.

4-6. Example 5

Review of Cross-Sectional Area of Branch Flow Path

An influence when a structure in which a cross-sectional area of a branch flow path continuously decreases in an advancing direction of a flow of a liquid from a position immediately after branching, the cross-sectional area of the branch flow path is minimized, and then the cross-sectional area of the branch flow path continuously increases in the advancing direction of the flow of the liquid again is provided was reviewed.

(a) of FIG. 22 illustrates a schematic diagram of the above-described structure. Furthermore, (b) of FIG. 22 illustrates a schematic diagram of a structure in which a cross-sectional area of a branch flow path is constant. Flow rates in flow paths of such structures were simulated using the software used in Example 1. As a result, simulation results are illustrated in an upper portion in FIG. 22. Furthermore, diagrams obtained by schematically illustrating such simulation results are illustrated in a lower portion of FIG. 22. It was seen that a flow rate in a branch flow path of (a) of FIG. 22 is larger than a flow rate in the branch flow path of (b) of FIG. 22.

Also, FIG. 23 illustrates results obtained by comparing flow rates in certain cross sections in the branch flow paths in the above-described two structures. Positions in which such flow rates were measured are as illustrated in FIG. 22. As illustrated in FIG. 23, a flow rate of an inner side wall and advection performance when a cross-sectional area is changed as described above are higher than those of a case in which a cross-sectional area is constant. Furthermore, a low speed region when a cross-sectional area is changed as described above is narrower than that of a case in which a cross-sectional area is constant. Thus, occurrence of a stagnation point in the branch flow path can be prevented by changing a cross-sectional area as described above.

4-7. Example 6

Review of Bending of Branch Flow Path

Effects of bending a direction of a branch flow path toward a particle fractionating flow path were reviewed.

A flow rate in the branch flow path in a structure in which the direction of the branch flow path was bent toward the particle fractionating flow path was simulated using the software used in Example 1. Likewise, a flow rate in the branch flow path in a structure in which the direction of the branch flow path is not changed was simulated. Positions in which flow rates were measured are as illustrated in FIG. 24. FIG. 25 illustrates measurement results of flow rates. As illustrated in FIG. 25, a difference between a flow rate in the vicinity of a wall on a microparticle fractionating flow path side and a flow rate in the vicinity of a wall on an opposite side thereof in the case of a structure in which a direction of the branch flow path is bent is smaller than that in the case of a structure in which a direction of the branch flow path is not changed. In other words, the imbalance between an inner side and an outer side of a flow path is eliminated. As a result, occurrence of a stagnation point in the branch flow path is prevented.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)
A microchip comprising:
a main flow path through which a liquid containing microparticles flows; and
a branch flow path that branches from the main flow path;
wherein:
a cross-sectional area of a portion of the main flow path is substantially constant up to a branch start position or decreases toward the branch start position, and
a radius of curvature R of a side wall that connects a side wall of the main flow path and a side wall of the branch flow path is 0.5 mm or less and more than 0 mm.

(2)
The microchip according to (1), in which an orifice section which is coaxial with the main flow path is provided; and the side wall that connects the side wall of the main flow path and the side wall of the branch flow path is between 0 μm and 300 μm from an orifice inlet to the orifice section.

(3)
The microchip according to (1) or (2), in which the cross-sectional area of the portion of the main flow path leading up to the branch start position is substantially constant, or decreases, so that the radius of curvature R of the side wall begins the branching of the branch flow path from the main flow path.

(4)
The microchip according to any of (1) to (3), in which a maximum cross-sectional area of the branch flow path is not more than half of the cross-sectional area of the main flow path at the branch start position.

(5)
The microchip according to any of (1) to (4), in which the branch flow path branches from the main flow path in a Y shape.

(6)
The microchip according to any of (1) to (5), in which a cross-sectional area of the branch flow path continuously decreases in an advancing direction of a flow of a liquid from a start position of the branch flow path.

(7)
The microchip according to any of (1) to (5), in which a cross-sectional area of the branch flow path continuously decreases from a start position of the branch flow path to a predetermined position in an advancing direction of a flow of a liquid and continuously increases from the predetermined position in an advancing direction of a flow of a liquid.

(8)
The microchip according to any of (1) to (7), in which a side wall of the branch flow path connected to the orifice section is bent toward an axis of the main flow path.

(9)
The microchip according to any of (1) to (8), in which an orifice section which is coaxial with the main flow path is provided; and an angle of a side wall of the branch flow path connected to the orifice section with respect to an axis of the main flow path is 115 to 160 degrees.

(10)

The microchip according to any of (1) to (9), in which an orifice section which is coaxial with the main flow path is provided; and an angle of a side wall of the branch flow path connected to the orifice section with respect to an axis of the main flow path is 125 to 160 degrees.

(11)

The microchip according to any of (1) to (10), in which an orifice section which is coaxial with the main flow path is provided; and a pressure chamber communicates with the orifice section and a pressure in the pressure chamber is reduced or increased.

(12)

The microchip according to (11), in which microparticles are guided into the orifice section by reducing a pressure in the pressure chamber or microparticles are advanced to the branch flow path by increasing a pressure in the pressure chamber.

(13)

The microchip according to any of (1) to (12), in which an orifice section which is coaxial with the main flow path is provided; and a flow path configured to form a flow of a liquid leading from the orifice section to the main flow path is provided in the orifice section, such that microparticles are advanced to the branch flow path due to the formed flow.

(14)

The microchip according to any of (1) to (13), in which the cross-sectional area of the portion of the main flow path leading up to the branch start position is constant up to the branch start position; and the cross-sectional area of a second portion of the main flow path increases as it extends from the branch start position along the side wall.

(15)

A microparticle sorting device able to receive a microchip, the microchip including:
 a main flow path through which a liquid containing microparticles flows; and
 a branch flow path that branches from the main flow path;
 wherein:
 a cross-sectional area of a portion of the main flow path is substantially constant up to a branch start position or decreases toward the branch start position, and
 a radius of curvature R of a side wall that connects a side wall of the main flow path and a side wall of the branch flow path is 0.5 mm or less.

(16)

The microparticle sorting device according to (15), including:
 a light irradiation unit configured to irradiate microparticles flowing through the main flow path with light;
 a detection unit configured to detect scattered light and/or fluorescence emitted from the microparticles; and
 a control unit configured to control an advancing direction of the microparticles flowing through the main flow path on the basis of data detected by the detection unit.

(17)

The microparticle sorting device according to (16), in which the control unit controls a pressure in a pressure chamber communicating with the orifice section.

(18)

The microparticle sorting device according to (16) or (17), in which the control unit controls a flow of a liquid in a flow path provided to form a flow of a liquid leading from the orifice section to the main flow path.

REFERENCE SIGNS LIST 100, 500 microchip
101, 501 sample liquid inlet
102, 502 sample liquid flow path
103, 503 sheath liquid inlet
104, 504 sheath liquid flow path
105, 505 main flow path
106, 506 detection region
107, 507 branch section
108, 508 branch flow path (waste flow path)
109, 509 particle fractionating flow path
110 branch flow path end
111 fractionating flow path end
201, 601 orifice section
202 gate flow inlet
301 cross section of main flow path in branch start position
302 cross section of branch flow path
303 cross section in which cross-sectional area of branch flow path is minimized
304 branch start position
401 side wall of main flow path
402 side wall of branch flow path
403 side wall configured to connect side wall of main flow path and side wall of branch flow path
404 orifice inlet

The invention claimed is:

1. A microchip comprising:
 a main flow path through which a liquid containing microparticles flows;
 a branch flow path configured to branch from the main flow path; and
 an orifice section which is coaxial with the main flow path,
 wherein a cross-sectional area of the main flow path is constant up to a branch start position or continuously decreases toward the branch start position,
 wherein a cross-sectional area of the branch flow path continuously decreases in an advancing direction of a flow of a liquid from a start position of the branch flow path, and
 a minimum cross-sectional area of the branch flow path is between one fifth and one half of the cross-sectional area of the main flow path at the branch start position, such that the minimum cross-sectional area is configured to reduce clogging.

2. The microchip according to claim 1, wherein a side wall configured to connect a side wall of the main flow path and a side wall of the branch flow path is at between 0 μm and 300 μm from an orifice inlet.

3. The microchip according to claim 1, wherein a radius of curvature R of a side wall configured to connect a side wall of the main flow path and a side wall of the branch flow path is 0.5 mm or less.

4. The microchip according to claim 1, wherein a maximum cross-sectional area of the branch flow path is not more than half of the cross-sectional area of the main flow path at the branch start position.

5. The microchip according to claim 1, wherein the branch flow path branches from the main flow path in a Y shape.

6. The microchip according to claim 1, wherein a cross-sectional area of the branch flow path continuously decreases from a start position of the branch flow path to a predetermined position in an advancing direction of a flow of a liquid and continuously increases from the predetermined position in an advancing direction of a flow of a liquid.

7. The microchip according to claim 1, wherein a side wall of the branch flow path connected to the orifice section is bent toward an axis of the main flow path.

8. The microchip according to claim 1, wherein an angle of a side wall of the branch flow path connected to the orifice section with respect to an axis of the main flow path is 115 to 160 degrees.

9. The microchip according to claim 1, wherein an angle of a side wall of the branch flow path connected to the orifice section with respect to an axis of the main flow path is 125 to 160 degrees.

10. The microchip according to claim 1, wherein a pressure chamber communicates with the orifice section and a pressure in the pressure chamber is reduced or increased.

11. The microchip according to claim 10, wherein microparticles are guided into the orifice section by reducing a pressure in the pressure chamber or microparticles are advanced to the branch flow path by increasing a pressure in the pressure chamber.

12. A microparticle fractionating device on which a microchip is mounted, the microchip comprising:
    a main flow path through which a liquid containing microparticles flows;
    a branch flow path configured to branch from the main flow path; and
    an orifice section which is coaxial with the main flow path,
    wherein a cross-sectional area of the main flow path is constant up to a branch start position or continuously decreases toward the branch start position,
    wherein a cross-sectional area of the branch flow path continuously decreases in an advancing direction of a flow of a liquid from a start position of the branch flow path, and
    a minimum cross-sectional area of the branch flow path is between one fifth and one half of the cross-sectional area of the main flow path at the branch start position, such that the minimum cross-sectional area is configured to reduce clogging.

13. The microparticle fractionating device according to claim 12, comprising:
    a light irradiation unit comprising a light source and a first lens configured to irradiate microparticles flowing through the main flow path with light;
    a detection unit comprising a second lens and a detector configured to detect scattered light and/or fluorescence emitted from the microparticles; and
    a control unit comprising a processor configured to control an advancing direction of the microparticles flowing through the main flow path on the basis of data detected by the detection unit.

14. The microparticle fractionating device according to claim 13, wherein the control unit controls a pressure in a pressure chamber communicating with the orifice section.

* * * * *